(12) United States Patent
Ma et al.

(10) Patent No.: US 12,118,233 B2
(45) Date of Patent: Oct. 15, 2024

(54) OPERATION METHODS OF STORAGE DEVICES, AND OPERATION METHODS OF STORAGE SYSTEMS INCLUDING HOSTS AND STORAGE DEVICES

(71) Applicant: Samsung Electronics Co., Ltd., Suwon-si (KR)

(72) Inventors: Jin-Hee Ma, Seoul (KR); Duckho Bae, Seoul (KR); Youngjin Yu, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 151 days.

(21) Appl. No.: 17/864,653

(22) Filed: Jul. 14, 2022

(65) Prior Publication Data

US 2023/0153019 A1   May 18, 2023

(30) Foreign Application Priority Data

Nov. 16, 2021   (KR) .......................... 10-2021-0157669

(51) Int. Cl.
*G06F 3/06* (2006.01)
(52) U.S. Cl.
CPC .......... *G06F 3/0655* (2013.01); *G06F 3/0604* (2013.01); *G06F 3/0688* (2013.01)
(58) Field of Classification Search
CPC .... G06F 3/0655; G06F 3/0604; G06F 3/0688; G06F 3/0632; G06F 3/064; G06F 3/0679; G06F 3/061; G06F 3/0619; G06F 3/0659; G06F 11/1076; G06F 11/108
See application file for complete search history.

(56) References Cited

U.S. PATENT DOCUMENTS

| | | | |
|---|---|---|---|
| 7,827,351 B2 | 11/2010 | Suetsugu et al. |
| 7,895,393 B2 | 2/2011 | Li |
| 8,209,476 B2 | 6/2012 | Moore et al. |
| 8,301,835 B2 | 10/2012 | Kim |

(Continued)

FOREIGN PATENT DOCUMENTS

| | | | |
|---|---|---|---|
| JP | H07-306758 A | 11/1995 |
| JP | 2006-134026 A | 5/2006 |

(Continued)

OTHER PUBLICATIONS

"Base Specification" *NVM Express* (Mar. 9, 2020).

*Primary Examiner* — Masud K Khan
(74) *Attorney, Agent, or Firm* — Harness, Dickey & Pierce, P.L.C.

(57) ABSTRACT

Disclosed is an operation method including generating RAID parity data based on first data in response to an RAID enable request and a first write request, the RAID enable request and the first write request being received from an external host, the RAID enable request including a first stream identifier and a RAID enable indication, and the first write request including the first stream identifier and the first data, storing the first data and the RAID parity data based on the first stream identifier, storing second data based on a second stream identifier in response to receiving a second write request from the external host, the second write request including the second stream identifier and the second data, and receiving an RAID disable request from the external host, the RAID disable request including the first stream identifier and a RAID disable indication.

20 Claims, 23 Drawing Sheets

(56) References Cited

U.S. PATENT DOCUMENTS

| | | | |
|---|---|---|---|
| 9,594,633 | B2 | 3/2017 | Colgrove et al. |
| 9,812,224 | B2 | 11/2017 | Yun |
| 10,706,938 | B2 | 7/2020 | Cha et al. |
| 10,942,679 | B2 | 3/2021 | Kim et al. |
| 11,133,080 | B2 | 9/2021 | Park et al. |
| 2008/0288814 | A1 | 11/2008 | Kitahara |
| 2010/0281213 | A1 | 11/2010 | Smith et al. |
| 2012/0210061 | A1* | 8/2012 | Cheng ............... G06F 11/1092 711/E12.001 |
| 2012/0278527 | A1 | 11/2012 | Cho et al. |
| 2015/0082081 | A1* | 3/2015 | Akirav ............... G06F 11/1612 714/6.22 |
| 2018/0059988 | A1* | 3/2018 | Shivanand ............ G06F 3/0659 |
| 2020/0210283 | A1* | 7/2020 | Palmer .............. H03M 13/2906 |
| 2021/0200477 | A1 | 7/2021 | Seo et al. |

FOREIGN PATENT DOCUMENTS

| | | |
|---|---|---|
| KR | 10-2007-0046844 A | 5/2007 |
| KR | 10-2013-0040606 A | 4/2013 |
| KR | 10-2016-0044289 A | 4/2016 |
| KR | 10-2018-0133982 A | 12/2018 |
| KR | 10-2019-0129500 A | 11/2019 |
| KR | 10-2020-0053204 A | 5/2020 |
| KR | 10-2021-0085674 A | 7/2021 |
| WO | WO-2007081638 A2 | 7/2007 |

\* cited by examiner

FIG. 17

| Byte# | Byte3 | Byte2 | Byte1 | Byte0 |
|---|---|---|---|---|
| Dword0 | | CDW0 | | |
| Dword1 | | NSID | | |
| Dword2 | | CDW2 | | |
| Dword3 | | CDW3 | | |
| Dword4 | | MPTR | | |
| Dword5 | | | | |
| Dword6 | | DPTR | | |
| Dword7 | | | | |
| Dword8 | | | | |
| Dword9 | | | | |
| Dword10 | | SLBA | | |
| Dword11 | | | | |
| Dword12 | | CDW12 | | |
| Dword13 | Reserved | DSPEC | | DSM |
| Dword14 | | CDW14 | | |
| Dword15 | LBATM | | LBAT | |

| Bits | Description |
|---|---|
| 31:16 | CID |
| 15:14 | PSDT |
| 13:10 | Reserved |
| 09:08 | FUSE |
| 07:00 | OPC(WRITE) |

| Bits | Description |
|---|---|
| 31 | LR |
| 30 | FUA |
| 29:26 | PRINFO |
| 25 | Reserved |
| 24 | STC |
| 23:20 | DTYPE |
| 19:16 | Reserved |
| 15:00 | NLB |

OPERATION METHODS OF STORAGE DEVICES, AND OPERATION METHODS OF STORAGE SYSTEMS INCLUDING HOSTS AND STORAGE DEVICES

CROSS-REFERENCE TO RELATED APPLICATIONS

This application claims priority under 35 U.S.C. § 119 to Korean Patent Application No. 10-2021-0157669 filed on Nov. 16, 2021, in the Korean Intellectual Property Office, the disclosures of which are incorporated by reference herein in their entireties.

BACKGROUND

Some example embodiments of the present disclosure described herein relate to a semiconductor memory, and more particularly, relate to an operation method of a storage device, and an operation method of a storage system including a host and the storage device.

A semiconductor memory device is classified as a volatile memory device, in which stored data disappear when a power supply is turned off, such as a static random access memory (SRAM) or a dynamic random access memory (DRAM), or a nonvolatile memory device, in which stored data are retained even when a power supply is turned off, such as a flash memory device, a phase-change RAM (PRAM), a magnetic RAM (MRAM), a resistive RAM (RRAM), or a ferroelectric RAM (FRAM).

Nowadays, flash memory-based solid state drives (SSDs) are being widely used as high-capacity storage mediums of computing systems. A host using such an SSD may generate various kinds of data according to corresponding applications. To improve the operational performance of the storage device, the host may provide information about data to the storage device together with the data.

SUMMARY

Some example embodiments of the present disclosure provide an operation method of a storage device having improved performance and improved lifetime by setting RAID information in units of stream, and an operation method of a storage system including a host and the storage device.

According to some example embodiments, an operation method of a storage device includes generating Redundant Array of Independent Disks (RAID) parity data based on first data in response to an RAID enable request and a first write request, the RAID enable request and the first write request being received from an external host, the RAID enable request including a first stream identifier and a RAID enable indication, and the first write request including the first stream identifier and the first data, storing the first data and the RAID parity data in a nonvolatile memory device based on the first stream identifier, storing second data in the nonvolatile memory device based on a second stream identifier in response to receiving a second write request from the external host, the second write request including the second stream identifier and the second data, and receiving an RAID disable request from the external host, the RAID disable request including the first stream identifier and a RAID disable indication.

According to some example embodiments, an operation method of a storage device includes storing first data in a nonvolatile memory device based on a first stream identifier in response to a first write request, the first write request being received from an external host, and the first write request including the first stream identifier and the first data, generating Redundant Array of Independent Disks (RAID) parity data based on second data in response to an RAID enable request and a second write request, the second write request being received from the external host after the RAID enable request is received from the external host, the RAID enable request including the first stream identifier, and the second write request including the first stream identifier and the second data, storing the second data and the RAID parity data in the nonvolatile memory device based on the first stream identifier, storing third data in the nonvolatile memory device based on the first stream identifier in response to a RAID disable request and a third write request, the RAID disable request and the third write request being received from the external host, the RAID disable request being received after the storing the second data and the RAID parity data, the RAID disable request including the first stream identifier, and the third write request including the first stream identifier and the third data, and storing fourth data in the nonvolatile memory device based on a second stream identifier in response to a fourth write request, the fourth write request being received from the external host, and the fourth write request including the second stream identifier and the fourth data.

According to some example embodiments, an operation method of a storage system, the storage system including a host and a storage device, the method includes sending, by the host, a first directive send command including a first stream identifier and a Redundant Array of Independent Disks (RAID) enable indication, setting, by the storage device, first RAID information corresponding to the first stream identifier to an enable state in response to the first directive send command, sending, by the host, a first write request to the storage device, the first write request including the first stream identifier and first data, generating, by the storage device, RAID parity data based on the first data in response to the first write request and the first RAID information being set to the enable state, storing, by the storage device, the first data and the RAID parity data in a nonvolatile memory device based on the first stream identifier, sending, by the host, a second write request to the storage device, the second write request including a second stream identifier and second data, storing, by the storage device, the second data in the nonvolatile memory device based on the second stream identifier in response to the second write request, sending, by the host, a second directive send command including the first stream identifier and an RAID disable indication, and setting, by the storage device, the first RAID information to a disable state in response to the second directive send command.

BRIEF DESCRIPTION OF THE FIGURES

The above and other objects and features of the present disclosure will become apparent by describing in detail some example embodiments thereof with reference to the accompanying drawings.

FIG. 17 is a diagram illustrating an example of a write request.

DETAILED DESCRIPTION

Below, some example embodiments of the present disclosure will be described in detail and clearly to such an extent that one skilled in the art may easily carry out the present disclosure.

Figure 1:
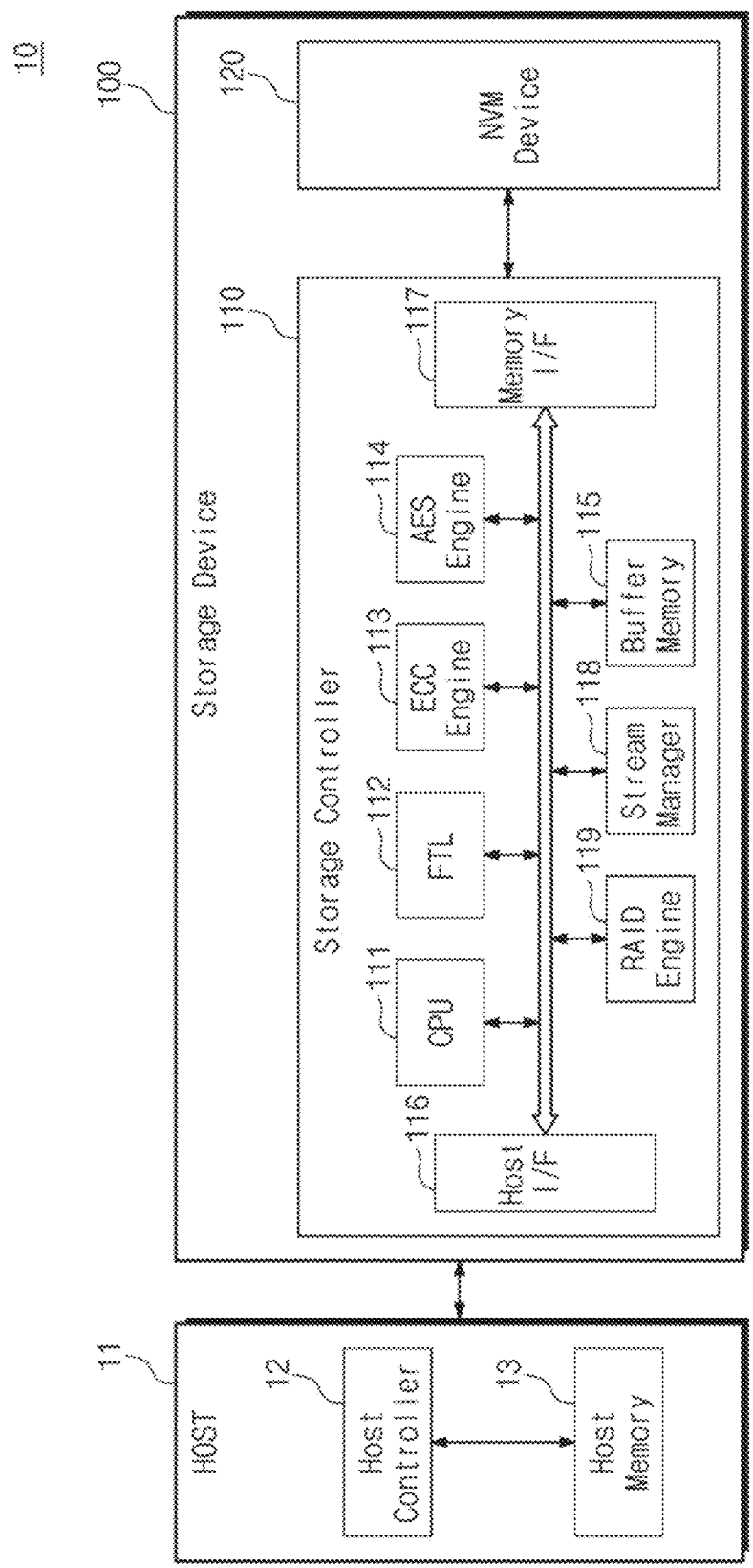
FIG. 1 is a block diagram illustrating a storage system according to some example embodiments of the present disclosure.

FIG. 1 is a block diagram illustrating a storage system according to some example embodiments of the present disclosure. Referring to FIG. 1, a storage system 10 may include a host 11 and a storage device 100. In some example embodiments, the storage system 10 may be one of several information processing devices, which are configured to process a variety of information and to store the processed information, such as a personal computer (PC), a laptop, a server, a workstation, a smartphone, a tablet PC, a digital camera, a black box, etc.

The host 11 may control an overall operation of the storage system 10. For example, the host 11 may send, to the storage device 100, a request (RQ) for storing data "DATA" in the storage device 100 or reading the data "DATA" stored in the storage device 100. According to some example embodiments, operations described herein as being performed by the host 11 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. For instance, in some example embodiments, the host 11 may be a processor core, which is configured to control the storage system 10, such as a central processing unit (CPU) or an application processor, or may be a computing node connected over a network.

In some example embodiments, the host 11 may include a host controller 12 and/or a host memory 13. The host controller 12 may be a device (e.g., processing circuitry) configured to control an overall operation of the host 11 or to allow the host 11 to control the storage device 100. The host memory 13 may be a buffer memory, a cache memory, or a working memory that is used in the host 11.

In some example embodiments, the data received from the host 11 may have various attributes or various characteristics. For example, the characteristics may include information such as a lifetime of data, a logical block address (LBA) range, a request size, an overwrite ratio, and a logical block address continuity of adjacent write requests (or workloads) (or a logical block address continuity of input/output requests adjacent to an input/output request), etc. In the case where data are stored in a nonvolatile memory device 120 without separate data classification, a maintenance operation (e.g., a garbage collection operation) for the nonvolatile memory device 120 may be frequently performed. For example, a frequent maintenance operation of the nonvolatile memory device 120 may cause an increase of a write amplification factor (WAF) characteristic of the storage device 100 (e.g., may cause a reduction of performance of the storage device 100).

In some example embodiments, the host 11 may manage data based on a stream. For example, a stream identifier may be information for classifying data depending on data characteristics. The host 11 may allocate a stream identifier SID to data to be stored to the storage device 100, based on attributes or characteristics of the data. That is, data of the same attributes or similar attributes may be managed by the same stream identifier (or similar stream identifiers). Alternatively or additionally, the same stream identifier, or similar stream identifiers, may be allocated to data associated with each other.

For example, the host 11 may allocate different stream identifiers to data generated according to the execution of different applications, and may allocate the same stream identifier (or similar stream identifiers) to data generated from the same application (or similar applications). However, the present disclosure is not limited thereto. For example, different stream identifiers may be allocated to data generated from the same application (or similar applications), depending on characteristics of the data.

In some example embodiments, the host 11 may send requests including the stream identifier SID to the storage device 100. For example, the host 11 may send an input/output request including the stream identifier SID and a manager request to the storage device 100.

In some example embodiments, the host 11 may set RAID information for each stream. For example, the host 11 may send an RAID setting request for a specific stream to the storage device 100. With regard to a specific stream, the host 11 may send an RAID enable request to the storage device 100 such that data are stored by using the RAID. With regard to a specific stream, the host 11 may send an RAID disable request to the storage device 100 such that data are stored without using the RAID.

The storage device 100 may operate under control of the host 11. The storage device 100 may include a storage controller 110 and/or the nonvolatile memory device 120. Under control of the host 11, the storage controller 110 may store data in the nonvolatile memory device 120 or may read data stored in the nonvolatile memory device 120. In some example embodiments, the storage controller 110 may perform various management operations for efficiently using the nonvolatile memory device 120.

The storage controller 110 may include a central processing unit (CPU) 111, a flash translation layer (FTL) 112, an error correction code (ECC) engine 113, an advanced encryption standard (AES) engine 114, a buffer memory 115, a host interface circuit 116, a memory interface circuit 117, a stream manager 118, and/or a redundant array of independent disks (RAID) engine 119. According to some example embodiments, operations described herein as being performed by the storage controller 110, the CPU 111, the FTL 112, the ECC engine 113, the AES engine 114, the stream manager 118 and/or the RAID engine 119 may be performed by processing circuitry.

The CPU 111 may control an overall operation of the storage controller 110. The FTL 112 may perform various operations for efficiently using the nonvolatile memory device 120. For example, the host 11 may manage a storage space of the storage device 100 by using logical addresses. The FTL 112 may be configured to manage address mapping between a logical address from the host 11 and a physical address of the storage device 100. The FTL 112 may perform a wear-leveling operation to prevent or reduce excessive degradation of a specific memory block of memory blocks of the nonvolatile memory device 120. A lifetime of the nonvolatile memory device 120 may be improved by the wear-leveling operation of the FTL 112. The FTL 112 may perform a garbage collection operation on the nonvolatile memory device 120 to secure a free memory block.

In some example embodiments, the FTL 112 may be implemented in the form of hardware or software. In the case where the FTL 112 is implemented in the form of software, a program code or information associated with the FTL 112 may be stored in the buffer memory 115 and may be executed by the CPU 111. In the case where the FTL 112 is implemented in the form of hardware, a hardware accelerator configured to perform the operations of the FTL 112 may be provided to be independent of the CPU 111.

The ECC engine 113 may perform error detection and correction on data read from the nonvolatile memory device 120. For example, the ECC engine 113 may generate an error correction code (or a parity bit) for data to be written in the nonvolatile memory device 120. The generated error correction code (or parity bit) may be stored in the nonvolatile memory device 120 together with the data to be written. Afterwards, when the written data are read from the nonvolatile memory device 120, the ECC engine 113 may detect and correct an error of the read data based on the read data and the corresponding error correction code (or the corresponding parity bit).

The AES engine 114 may perform an encryption operation on data received from the host 11 or may perform a decryption operation on data received from the nonvolatile memory device 120. In some example embodiments, the encryption operation and the decryption operation may be performed based on a symmetric-key algorithm.

The buffer memory 115 may be a write buffer or a read buffer configured to temporarily store data input to the storage controller 110. Alternatively or additionally, the buffer memory 115 may be configured to store a variety of information used for the storage controller 110 to operate. For example, the buffer memory 115 may store a mapping table that is managed by the FTL 112. Alternatively or additionally, the buffer memory 115 may store software, firmware, or information that is associated with the FTL 112. In detail, the buffer memory 115 may store a stream table including stream information. The buffer memory 115 may store metadata for memory blocks.

In some example embodiments, the buffer memory 115 may be an SRAM, but the present disclosure is not limited thereto. For example, the buffer memory 115 may be implemented with various kinds of memory devices such as a DRAM, an MRAM, and a PRAM. For brevity of drawing and for convenience of description, an example in which the buffer memory 115 is included in the storage controller 110 is illustrated in FIG. 1, but the present disclosure is not limited thereto. The buffer memory 115 may be placed outside the storage controller 110, and the storage controller 110 may communicate with the buffer memory 115 over a separate communication channel or interface.

The host interface circuit 116 may communicate with the host 11 in compliance with a given interface protocol. In some example embodiments, the given interface protocol may include at least one of protocols for various interfaces such as an ATA (Advanced Technology Attachment) interface, an SATA (Serial ATA) interface, an e-SATA (external SATA) interface, an SCSI (Small Computer Small Interface) interface, an SAS (Serial Attached SCSI) interface, a PCI (Peripheral Component Interconnection) interface, a PCIe (PCI express) interface, an NVMe (NVM express) interface, an IEEE 1394 interface, an USB (Universal Serial Bus) interface, an SD (Secure Digital) card interface, an MMC (Multi-Media Card) interface, an eMMC (embedded Multi-Media Card) interface, an UFS (Universal Flash Storage) interface, an eUFS (embedded Universal Flash Storage) interface, and/or a CF (Compact Flash) card interface. The host interface circuit 116 may receive a signal, which is based on the given interface protocol, from the host 11 and may operate based on the received signal. Alternatively or additionally, the host interface circuit 116 may send a signal, which is based on the given interface protocol, to the host 11.

The memory interface circuit 117 may communicate with the nonvolatile memory device 120 in compliance with a given communication protocol. In some example embodiments, the given interface protocol may include at least one of protocols for various interfaces such as a toggle interface and an open NAND flash interface (ONFI). In some example embodiments, the memory interface circuit 117 may communicate with the nonvolatile memory device 120 based on the toggle interface. In this case, the memory interface circuit 117 may communicate with the nonvolatile memory device 120 over a plurality of channels. In some example embodiments, each of the plurality of channels may include a plurality of signal lines configured to transfer various control signals (e.g., /CE, CLE, ALE, /WE, /RE, and R/B), data signals DQ, and/or a data strobe signal DQS.

The stream manager 118 may manage data or input/output requests received from the host 11 in units of stream. The stream manager 118 may store data in the nonvolatile memory device 120 based the stream identifier SID included in a request. In this case, because data of similar characteristics are classified as the same stream (or similar streams), the number of times of a maintenance operation for the nonvolatile memory device 120 is performed may decrease. Accordingly, decline in the performance of the storage device 100 may be prevented or reduced.

In some example embodiments, the stream manager 118 according to the present disclosure may manage stream information in units of stream by using the stream table. The stream information may include a variety of information about a stream. For example, the stream information may include RAID information and/or a block status.

For example, the RAID information may refer to information about whether to apply an RAID manner to a corresponding stream. In the case where the RAID information indicates an enable state, the storage controller 110 may store corresponding stream data by using the RAID manner. In the case where the RAID information indicates a disable state, the storage controller 110 may store corresponding stream data without using the RAID manner.

Below, to describe some example embodiments of the present disclosure easily, the terms "stream", "stream identifier", etc. are used. The stream may mean a set of data having the same or similar characteristics. Alternatively or additionally, the stream may mean a set of data whose logical block addresses managed by the host 11 are continuous (or sequential). The stream identifier SID that is allocated to each of a plurality of streams may refer to unique information for classifying the plurality of streams.

The RAID engine 119 may be configured to generate parity data (e.g., RAID parity data) for data to be stored in the nonvolatile memory device 120. For example, a plurality of data may be stored in the nonvolatile memory device 120. In this case, the plurality of data may constitute one stripe. The RAID engine 119 may generate parity data for one stripe by processing data included in one stripe.

In detail, when one stripe includes 7 unit data (e.g., 7 units of data), the RAID engine 119 may generate one parity data having the same size as (or a similar size to) one unit data (e.g., one unit of data) by performing an XOR operation on the 7 unit data. In this case, one stripe may be composed of 7 unit data and one parity data. However, the present disclosure is not limited thereto. For example, the number of unit data (e.g., units of data) included in one stripe, the size of parity data, and/or the number of parity data may be determined by an RAID policy of the RAID engine 119.

In the case of using the RAID manner, various additional operations such as an operation of generating parity data are performed. As the amount of data increases, the load and latency associated with performing the above operations increase. This means that the performance of a storage device or a storage system is reduced. Also, the parity data causes a decrease in the capacity of the storage device. For this reason, a conventional storage device manages only internal metadata by using the RAID manner and does not apply the RAID manner to user data.

In the case of applying the RAID manner to user data, the conventional storage device uses the RAID manner with respect to the whole region. That is, the conventional storage device fails to apply the RAID manner only to user data and instead applies the RAID manner to the whole user data. In this case, the performance and capacity of the conventional storage device or storage system decrease.

In contrast, the storage device 100 according to some example embodiments of the present disclosure may apply the RAID manner only to a portion of user data. The storage device 100 may support a plurality of streams and may apply the RAID manner only to a specific stream among the plurality of streams. The storage device 100 may enable or disable the RAID with respect to a specific stream while being used or operating (e.g., without a power-off or reset operation). In other words, the storage device 100 may turn on or turn off an RAID option with respect to a specific stream without a firmware change (or update). According to some example embodiments, the storage device 100 may change a storage manner between the RAID manner and the normal manner for a specific stream, without performing a firmware update, such that reception of a subsequent data write request for the specific stream causes storage of corresponding data for the specific stream according to the changed storage manner.

In some example embodiments, the host 11 may send or provide the RAID setting request including the stream identifier SID to the storage device 100. The host 11 may set RAID information about a stream indicated by the stream identifier SID through the RAID setting request. Alternatively or additionally, the host 11 may provide RAID information about a stream indicated by the stream identifier SID through the RAID setting request.

In some example embodiments, the RAID setting request may include the RAID enable request and the RAID disable request. The host 11 may enable the RAID with respect to a specific stream through the RAID enable request. The specific stream refers to a stream that the stream identifier SID included in the RAID setting request indicates. The host 11 may disable the RAID with respect to a specific stream through the RAID disable request.

In some example embodiments, the storage device 100 may receive the RAID setting request. For example, the storage device 100 may receive the RAID enable request including the stream identifier SID. The storage device 100 may check the stream identifier SID from the RAID enable request. That is, the storage device 100 may determine the stream identifier SID corresponding to the RAID enable request.

In some example embodiments, in response to the RAID enable request, the storage device 100 may apply or use the RAID manner to or for input/output requests received (e.g., to be received later) with regard to the specific stream indicated by the stream identifier SID. The storage device 100 may receive the RAID disable request including the stream identifier SID. In some example embodiments, in response to the RAID disable request, the storage device 100 may not apply or use the RAID manner to or for input/output requests received (e.g., to be received later) with regard to the specific stream indicated by the stream identifier SID.

As described above, the storage device 100 according to some example embodiments of the present disclosure may apply or use the RAID to or for data for which higher reliability is desired. In contrast, the storage device 100 may not apply or use the RAID to or for data for which higher reliability is not desired. Also, the storage device 100 may change RAID settings associated with a specific stream without a firmware change. As such, the storage device 100 that has improved performance and manages a storage space efficiently is provided.

Figure 2:
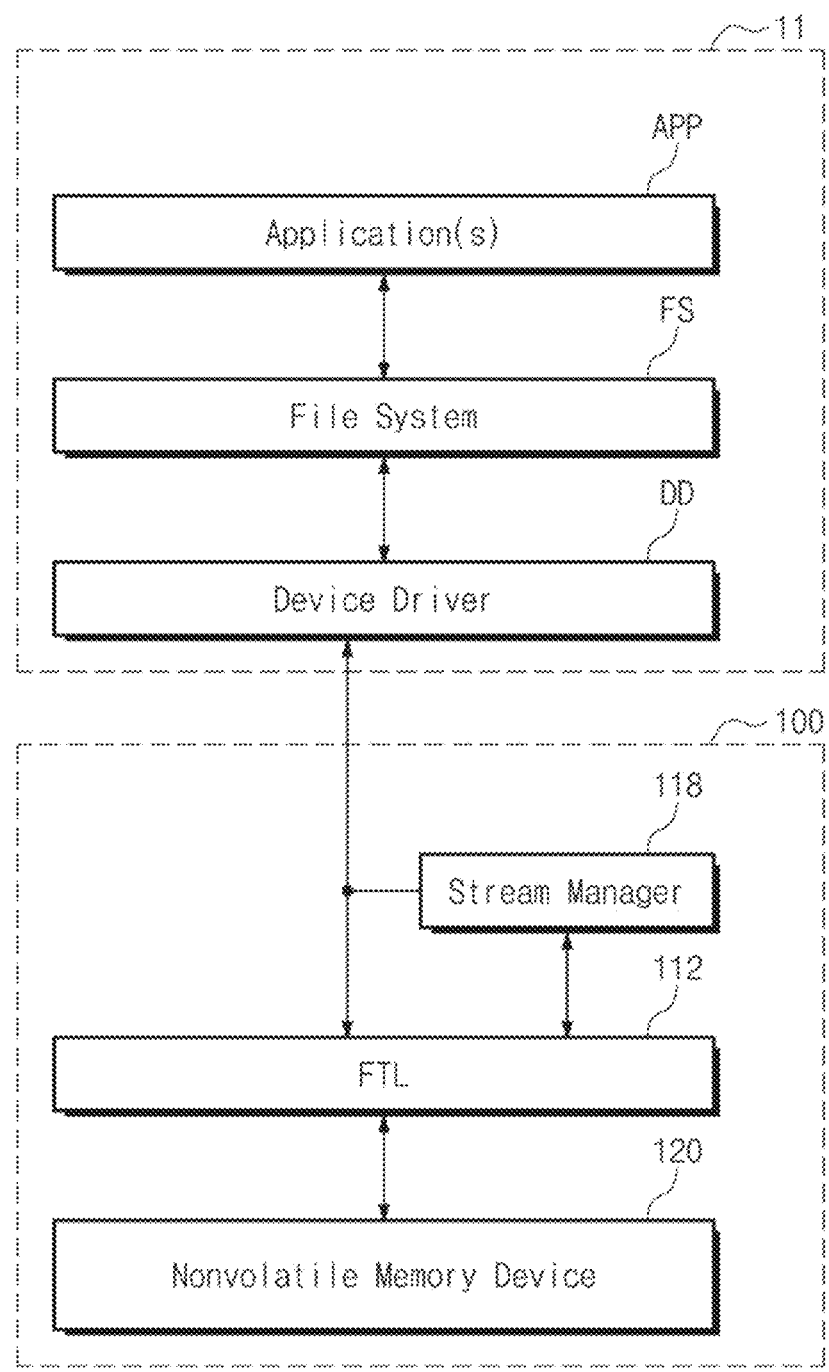
FIG. 2 is a diagram illustrating software layers of a storage system of FIG. 1.

FIG. 2 is a diagram illustrating software layers of a storage system of FIG. 1. Referring to FIGS. 1 and 2, the storage system 10 may include a plurality of software layers, that is, an application layer APP, a file system layer FS, a device driver layer DD, the stream manager 118, and/or the FTL 112. According to some example embodiments, the plurality of software layers may be executed by processing circuitry.

The application layer APP may include various application programs that are driven by the host 11. The file system layer FS may be configured to organize files or data that are used by the application layer APP. For example, the file system layer FS may manage the storage space of the storage device 100 as a logical block address LBA. The file system layer FS may allocate a logical block address to data to be stored in the storage device 100 and may manage the logical block address. In some example embodiments, the file system layer FS may have a type that is variable depending on an operating system of the host 11. The file system layer FS may include at least one of various file systems such as FAT (File Allocation Table), FAT32, NTFS (NT File System), HFS (Hierarchical File System), JSF2 (Journaled File System2), XFS, ODS-5 (On-Disk Structure-5), UDF, ZFS, UFS (Unix File System), ext2, ext3, ext4, ReiserFS, Reiser4, ISO 9660, Gnome VFS, BFS, and/or WinFS. The device driver layer DD may translate information from the file system layer FS or the application layer APP into information that is recognizable by the storage device 100. In some example embodiments, the application layer APP, the file system layer FS, and the device driver layer DD may be implemented in the form of software and may be driven on the host 11. In some example embodiments, the application layer APP may be configured to allocate a stream identifier to an input/output request to be provided to the storage device 100. However, the present disclosure is not limited thereto. For example, the file system layer FS or the device driver layer DD may be configured to allocate a stream identifier to an input/output request to be provided to the storage device 100.

The stream manager 118 may be configured to determine a stream identifier of a request received from the host 11. In some example embodiments, the stream manager 118 may be configured to manage stream information for each stream.

The FTL 112 may be configured to translate a logical block address of a request received from the host 11 into a physical block address (or a physical address) to be used in the nonvolatile memory device 120. In some example embodiments, the FTL 112 may receive information about a stream identifier and may perform address mapping such that a request received from the host 11 is stored in the nonvolatile memory device 120 for each allocated stream.

Figure 3:
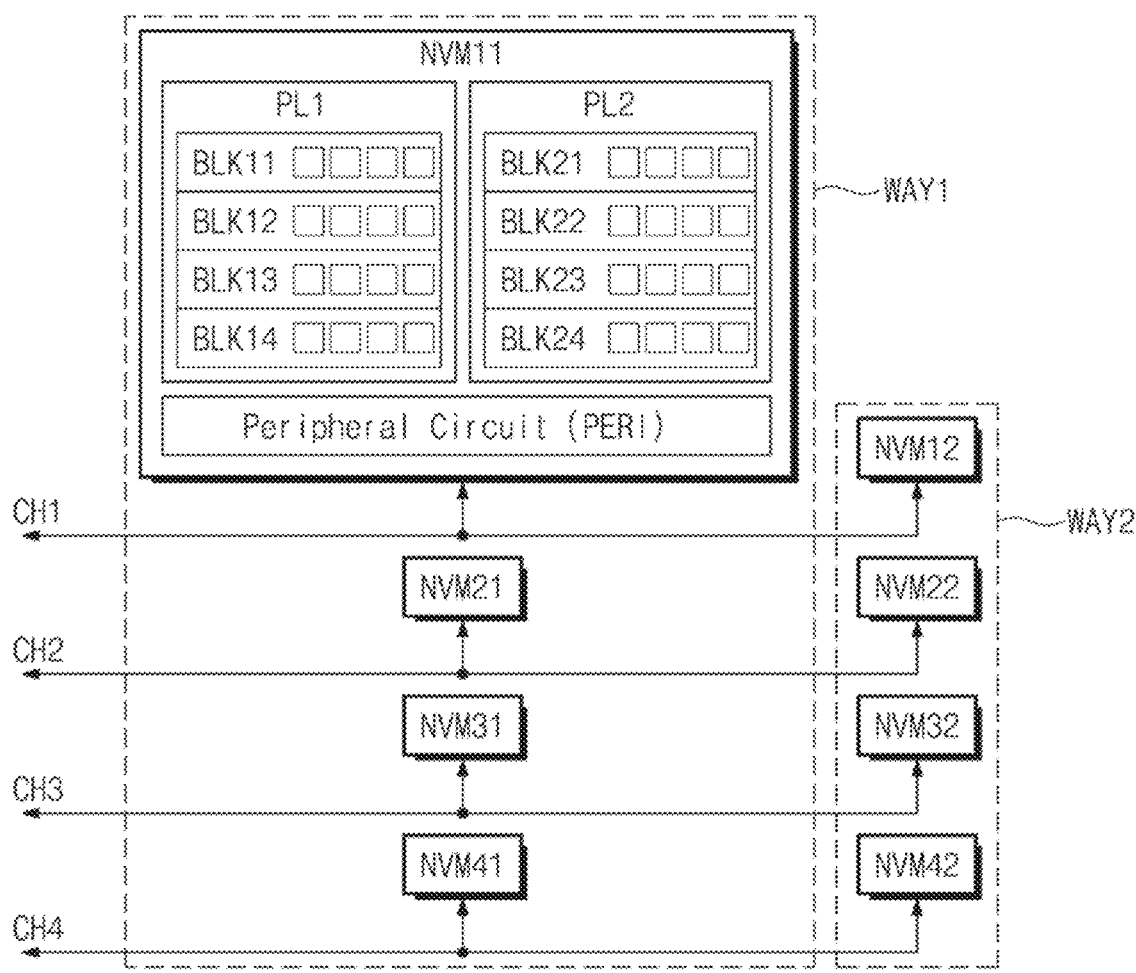
FIG. 3 is a block diagram illustrating a nonvolatile memory device of FIG. 1.
Figure 4:
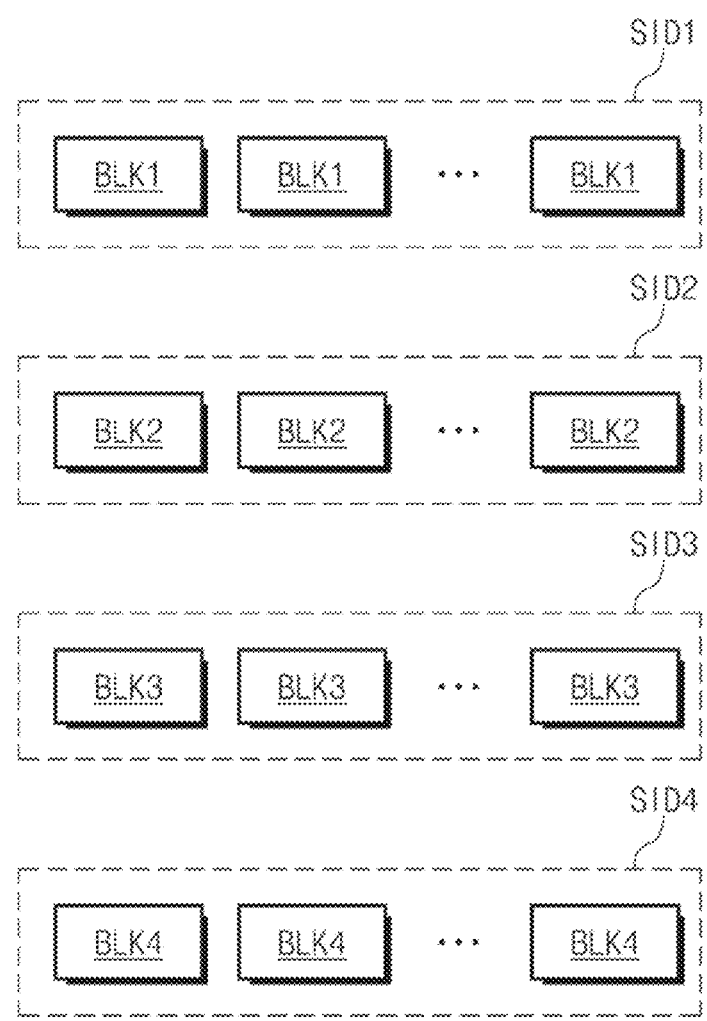
FIG. 4 is a diagram for describing streams managed at a storage device.

FIG. 3 is a block diagram illustrating a nonvolatile memory device of FIG. 1. FIG. 4 is a diagram for describing streams managed at a storage device. Referring to FIGS. 1, 3, and 4, the nonvolatile memory device 120 may include a plurality of nonvolatile memories NVM11 to NVM42. Each of the plurality of nonvolatile memories NVM11 to NVM42 may be implemented with one semiconductor chip, one semiconductor die, or one semiconductor package.

The nonvolatile memory NVM11 may include a plurality of planes PL1 and PL2 and a peripheral circuit PERI. The plane PL1 may include a plurality of memory blocks BLK11 to BLK14, and the plane PL2 may include a plurality of memory blocks BLK21 to BLK24. Each of the plurality of memory blocks BLK11 to BLK14 and BLK21 to BLK24 may include a plurality of pages. In some example embodiments, a plurality of memory blocks (e.g., BLK11 to BLK14) included in the same plane (e.g., PL1) (or similar planes) may be configured to share the same bit lines (or similar bit lines), but the present disclosure is not limited thereto.

The peripheral circuit PERI of the nonvolatile memory NVM11 may be connected with a corresponding channel (e.g., CH1) of a plurality of channels CH1 to CH4. In response to various signals received over the corresponding channel, the peripheral circuit PERI may store data received over the corresponding channel in the plurality of planes PL1 and PL2 or may output data read from the plurality of planes PL1 and PL2 over the corresponding channel. For the above operations, the peripheral circuit PERI may include various components such as an address decoder, a voltage generator, a page buffer circuit, an input/output circuit, and/or a control logic circuit. According to some example embodiments, the peripheral circuit PERI, the address decoder, the voltage generator, the page buffer circuit, the input/output circuit, and/or the control logic circuit may be implemented using processing circuitry.

For brevity of drawing, an example in which one nonvolatile memory NVM11 includes two planes PL1 and PL2 and each of the planes PL1 and PL2 includes four memory blocks is illustrated, but the present disclosure is not limited thereto. For example, the number of planes, the number of memory blocks, and/or the number of pages may be variously changed or modified. In some example embodiments, the remaining nonvolatile memories NVM12 to NVM42 are similar in structure to the nonvolatile memory NVM11 described above, and thus, additional description will be omitted to avoid redundancy.

In the plurality of nonvolatile memories NVM11 to NVM42, a first part NVM11 and NVM12 may communicate with the storage controller 110 over the first channel CH1, a second part NVM21 and NVM22 may communicate with the storage controller 110 over the second channel CH2, a third part NVM31 and NVM32 may communicate with the storage controller 110 over the third channel CH3, and a fourth part NVM41 and NVM42 may communicate with the storage controller 110 over the fourth channel CH4.

In the plurality of nonvolatile memories NVM11 to NVM42, a fifth part NVM11, NVM21, NVM31, and NVM41 may constitute a first way WAY1, and a sixth part NVM12, NVM22, NVM32, and NVM42 may constitute a second way WAY2. That is, the nonvolatile memory device 120 may have a multi-way/multi-channel structure, and it may be understood that some example embodiments are not limited to the structure illustrated in FIG. 3.

In some example embodiments, the storage device 100 may manage a plurality of memory blocks included in the nonvolatile memory device 120 based on a plurality of streams. For example, as illustrated in FIG. 4, the storage controller 110 may manage first memory blocks BLK1 of a plurality of memory blocks as a stream corresponding to a first stream identifier SID1, may manage second memory blocks BLK2 thereof as a stream corresponding to a second stream identifier SID2, may manage third memory blocks BLK3 thereof as a stream corresponding to a third stream identifier SID3, and may manage fourth memory blocks BLK4 thereof as a stream corresponding to a fourth stream identifier SID4.

In some example embodiments, memory blocks (e.g., the first memory blocks BLK1) corresponding to the same stream identifier (e.g., SID1) (or similar stream identifiers) may be included in the same plane (or similar planes), may be included in the same nonvolatile memory (or similar nonvolatile memories), may be included in nonvolatile memories connected with the same channel (or similar channels), or may be included in nonvolatile memories included in the same way (or similar ways). Alternatively or additionally, memory blocks (e.g., the first memory blocks BLK1) corresponding to a stream identifier (e.g., SID1) may be distributed into a plurality of nonvolatile memories. However, the above descriptions are simple examples, and the present disclosure is not limited thereto.

As described above, the storage system 10 may manage data of similar characteristics as the same stream (or similar streams), and thus, the data of the similar characteristics may be stored in memory blocks corresponding to the same stream (or similar streams). In this case, because data stored at the same stream (or similar streams) have similar characteristics, the decline in performance of the storage device 100 due to a maintenance operation (e.g., a garbage collection operation) may be prevented or reduced, or a write amplification factor (WAF) may decrease.

Figure 5:
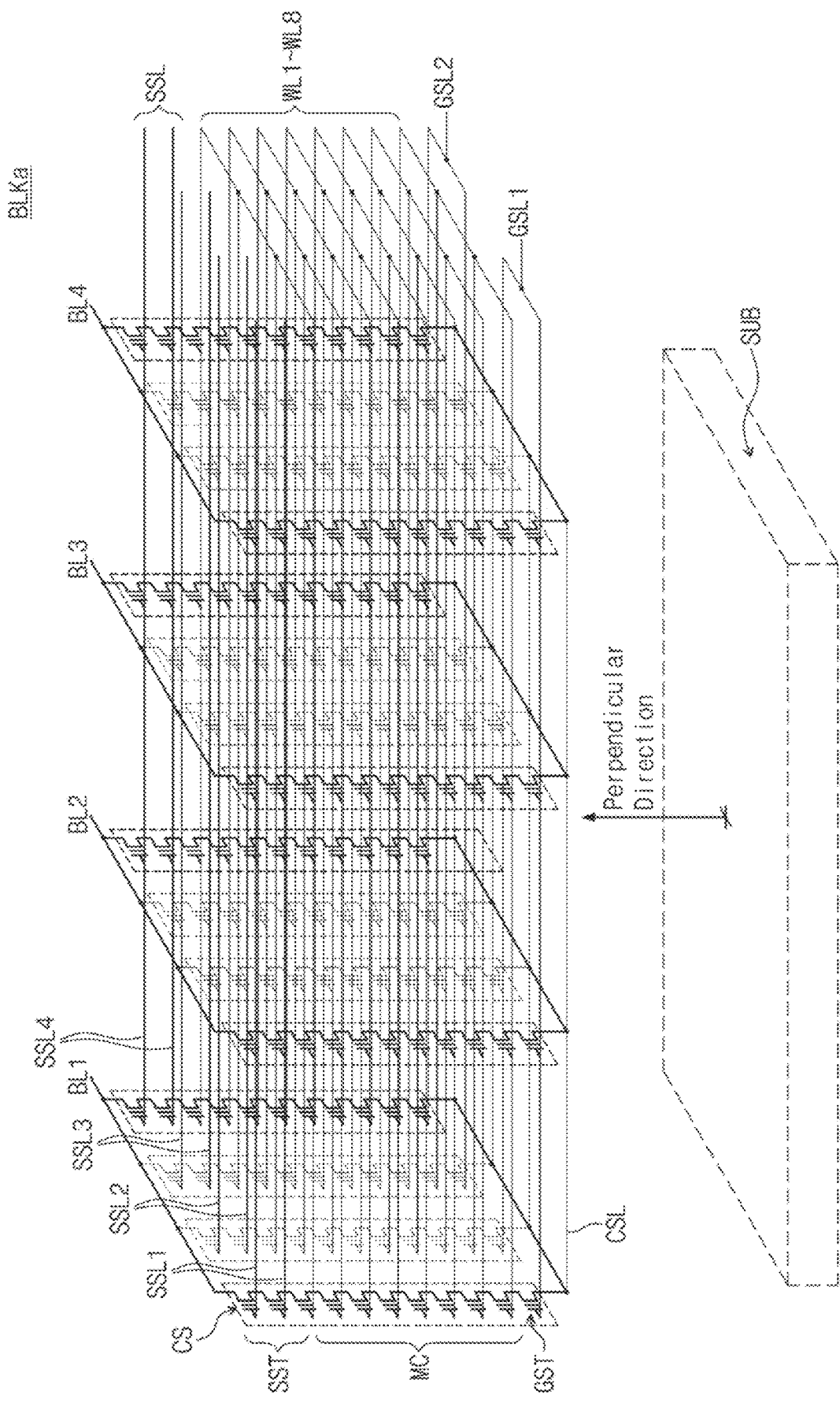
FIG. 5 is a circuit diagram of an example of one memory block of memory blocks of FIG. 3.

FIG. 5 is a circuit diagram illustrating an example of one memory block of the memory blocks discussed in connection with FIG. 3. Referring to FIGS. 3 and 5, a plurality of cell strings CS may be arranged on a substrate SUB in rows and columns. The plurality of cell strings CS may be connected in common with a common source line CSL formed on (or in) the substrate SUB. In FIG. 5, a location of the substrate SUB is depicted as an example for better understanding of the structure of a memory block BLKa.

An example in which the common source line CSL is connected with lower ends of the cell strings CS is illustrated in FIG. 5. However, it is sufficient if the common source line CSL is electrically connected with the lower ends of the cell strings CS, and the present disclosure is not limited to the case that the common source line CSL is physically located at the lower ends of the cell strings CS. An example in which the cell strings CS are arranged in a 4×4 matrix is illustrated in FIG. 5, but the number of cell strings CS in the memory block BLKa may increase or decrease.

Cell strings in each row may be connected in common with a ground selection line GSL1 or GSL2. For example, cell strings in first and second rows may be connected in common with the first ground selection line GSL1, and cell strings in third and fourth rows may be connected in common with the second ground selection line GSL2.

The cell strings in each row may be connected in common with corresponding string selection lines of first to fourth string selection lines SSL1 to SSL4. Cell strings in each column may be connected with a corresponding bit line of first to fourth bit lines BL1 to BL4. For ease of illustration and description, the cell strings CS connected with the second and third string selection lines SSL2 and SSL3 are depicted to be blurred.

Each cell string may include at least one ground selection transistor GST connected with the ground selection line GSL1 or GSL2, a plurality of memory cells MC1 to MC8 (collectively, MC) respectively connected with a plurality of word lines WL1 to WL8, and string selection transistors SST respectively connected with the string selection lines SSL1, SSL2, SSL3, or SSL4.

In each cell string, the ground selection transistor GST, the memory cells MC1 to MC8, and the string selection transistors SST may be connected in series along a direction perpendicular to the substrate SUB and may be sequentially stacked along the direction perpendicular to the substrate SUB. In each cell string, at least one of the memory cells MC1 to MC8 may be used as a dummy memory cell. The dummy memory cell may not be programmed (e.g., may be program-inhibited) or may be programmed differently from the remaining memory cells of the memory cells MC1 to MC8 other than the dummy memory cell.

In some example embodiments, memory cells of cell strings, which belong to each row and are located at the same height (or similar heights), may form one physical page. Memory cells constituting one physical page may be connected with one sub-word line. Sub-word lines of physical pages located at the same height (or similar heights) may be connected in common with one word line (one of WL1 to WL8).

In some example embodiments, sub-word lines of physical pages placed at the same height (or similar heights) may be connected with each other at a height at which the sub-word lines are formed. As another example, sub-word lines of physical pages placed at the same height (or similar heights) may be indirectly connected with each other in any other layer, which has a height different from a height at which the sub-word lines are formed, such as a metal layer.

In some example embodiments, when the memory block BLKa is implemented in a three-dimensional structure, characteristics of the memory cells MC may be differently implemented depending on heights of the memory cells MC. For example, sizes of the memory cells MC may change depending on heights of the memory cells MC.

Figure 6:
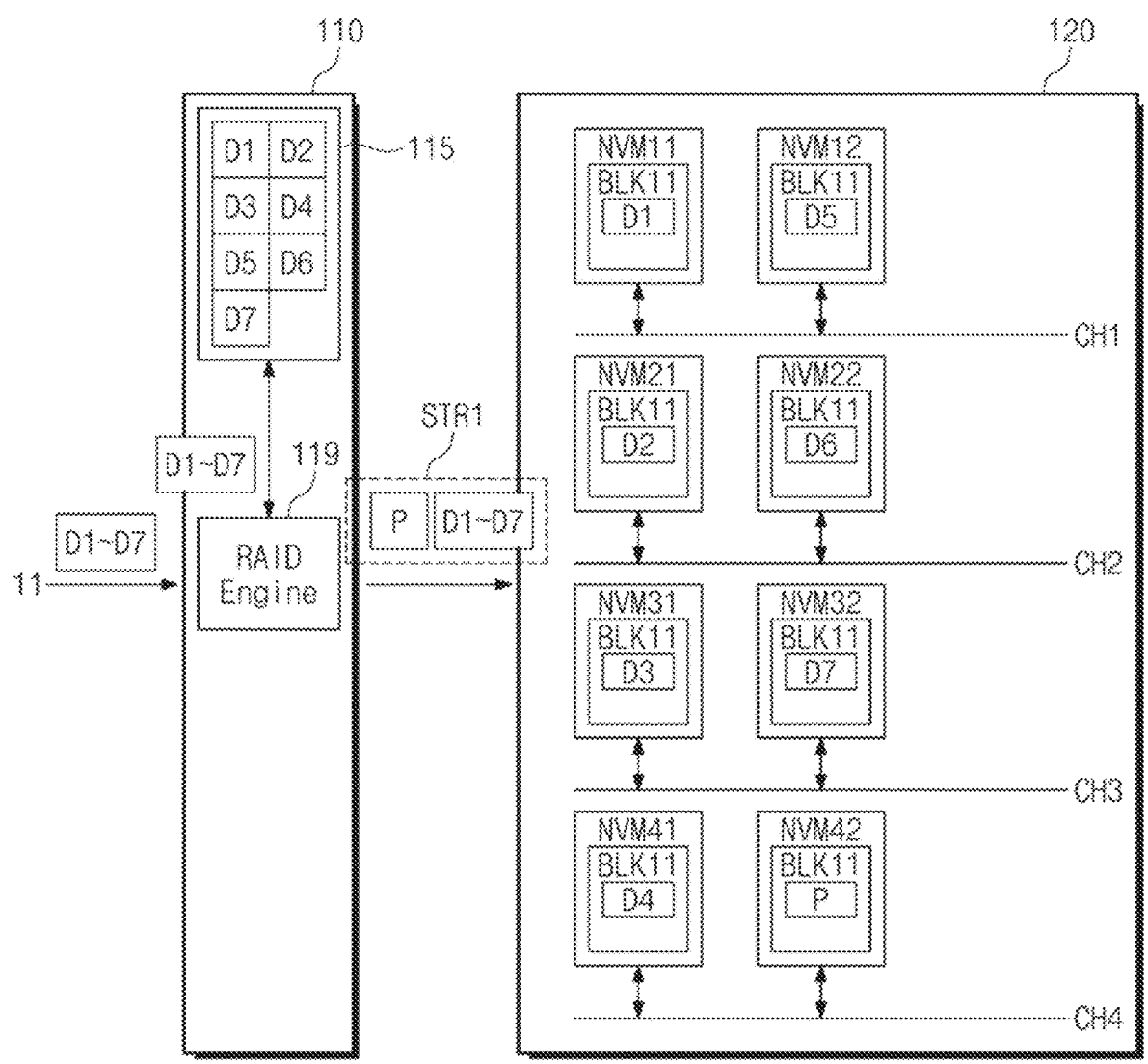
FIG. 6 is a diagram for describing an operation of an RAID engine of FIG. 1.

FIG. 6 is a diagram for describing an operation of an RAID engine of FIG. 1. Below, for convenience of description, some components of the storage device 100 are omitted for simplicity of description. Referring to FIGS. 1 and 6, the storage device 100 may store data in the nonvolatile memory device 120 in the RAID manner. Herein, the RAID may have various levels. For example, the RAID may have one of RAID level 0 (Striped set without parity or Striping), RAID level 1 (Mirrored set without parity or Mirroring), RAID level 2 (Hamming code parity), RAID level 3 (Striped set with dedicated parity, bit interleaved parity, or byte level parity), RAID level 4 (Block level parity), RAID level 5 (Striped set with distributed parity or interleave parity), RAID level 6 (Striped set with dual distributed parity), RAID level 7, RAID level 10, and/or RAID level 53, or may have a RAID level (e.g., RAID 0+1, RAID 1+0, RAID 5+0, RAID 5+1, or RAID 0+1+5) at which at least two of the above RAID levels are merged.

In some example embodiments, the storage device 100 may perform a write operation in the RAID manner. That is, the storage device 100 may generate parity data for a plurality of unit data and may store one stripe composed of the plurality of unit data and the parity data in the nonvolatile memory device 120. Below, for convenience of description, an operation of storing data by using the RAID manner is referred to as an "RAID write operation", and an operation of storing data without using the RAID manner (e.g., an operation in which parity data are not generated and are not stored) is referred to as a "normal write operation".

For example, the storage device 100 may receive first to seventh data D1 to D7 from the host 11. The first to seventh data D1 to D7 thus received may be stored in the buffer memory 115. In some example embodiments, although not illustrated in drawing, when the first to seventh data D1 to D7 are normally stored in the buffer memory 115, the storage controller 110 of the storage device 100 may send, to the host 11, a completion entry providing notification that the first to seventh data D1 to D7 are normally received. The host 11 may recognize that the first to seventh data D1 to D7 are normally stored in the storage device 100, based on the completion entry.

The storage controller 110 may store the first to seventh data D1 to D7 stored in the buffer memory 115 in the nonvolatile memory device 120. For example, the first data D1 may be stored in the memory block BLK11 of the nonvolatile memory NVM11, the second data D2 may be stored in the memory block BLK11 of the nonvolatile memory NVM21, the third data D3 may be stored in the memory block BLK11 of the nonvolatile memory NVM31, the fourth data D4 may be stored in the memory block BLK11 of the nonvolatile memory NVM41, the fifth data D5 may be stored in the memory block BLK11 of the nonvolatile memory NVM12, the sixth data D6 may be stored in the memory block BLK11 of the nonvolatile memory NVM22, and the seventh data D7 may be stored in the memory block BLK11 of the nonvolatile memory NVM32.

In this case, the RAID engine 119 of the storage controller 110 may generate parity data "P" based on the first to seventh data D1 to D7. The storage controller 110 may store the parity data "P" in the memory block BLK11 of the nonvolatile memory NVM42.

That is, a first stripe STR1 may include the first to seventh data D1 to D7 and the parity data "P". Because the first stripe STR1 includes the parity data "P", even though any one (e.g., D2) of user data included in the first stripe STR1 is not identified (e.g., even though an error is not corrected by the ECC engine 113), the second data D2 may be recovered based on the remaining data D0 and D3 to D7 and the parity data "P".

Figure 7:
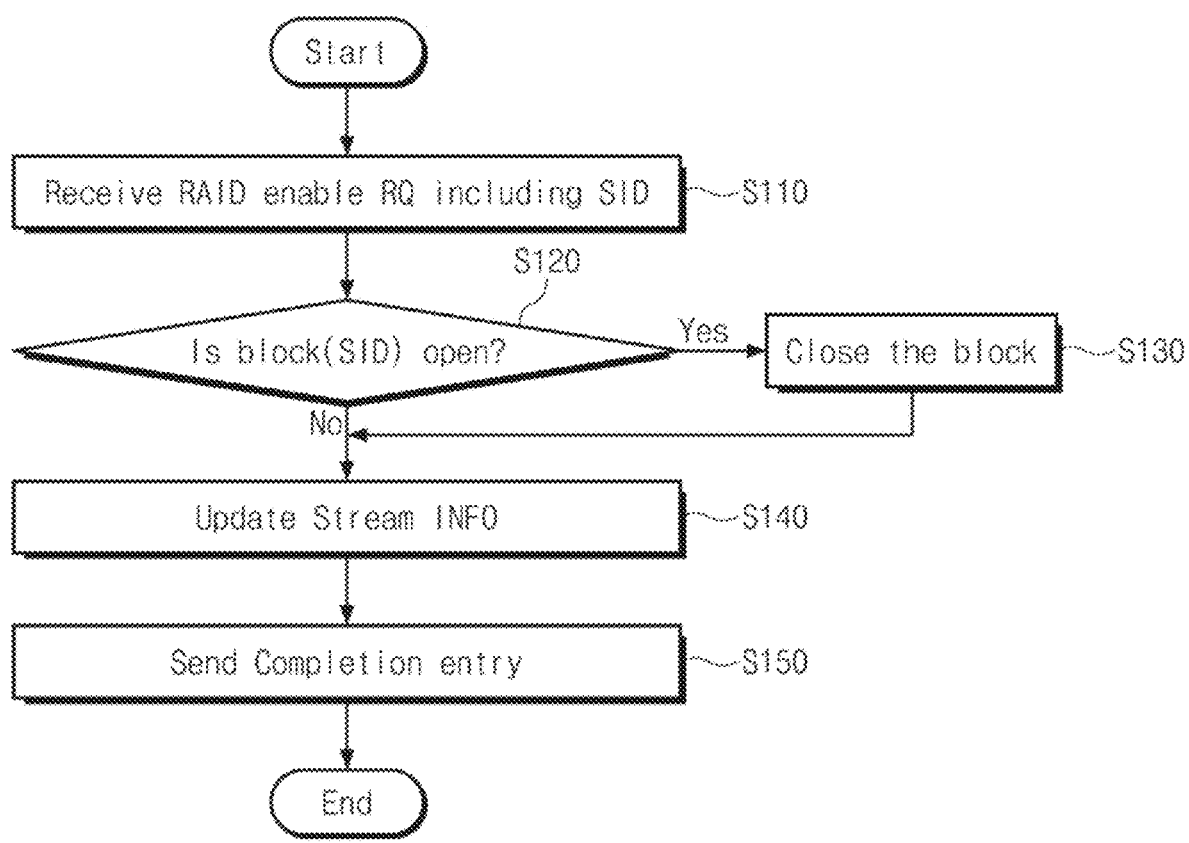
FIG. 7 is a flowchart illustrating an operation method of a storage device of FIG. 1.

FIG. 7 is a flowchart illustrating an operation method of a storage device of FIG. 1. Referring to FIGS. 1 and 7, in operation S110, the storage device 100 may receive the RAID enable request including the stream identifier SID from the host 11. For example, the storage controller 110 may fetch the RAID enable request, where the RAID enable request is an admin command from an admin submission queue (ASQ) of the host memory 13. Alternatively or additionally, the storage controller 110 may fetch the RAID enable request, where the RAID enable request is an input/output command from a submission queue (SQ) of the host memory 13. The storage controller 110 may check the stream identifier SID from the received RAID enable request.

In operation S120, the storage device 100 may determine whether a memory block or super block corresponding to the stream identifier SID is an open block. When it is determined that the memory block corresponding to the stream identifier SID is an open block, the storage device 100 performs operation S130; when it is determined that the memory block corresponding to the stream identifier SID is not an open block, the storage device 100 performs operation S140.

In some example embodiments, the storage device 100 may operate in units of sub-block, block, or super block. A sub-block may be a part of a memory block. A super block may include at least two or more memory blocks. Below, for convenience of description, the terms "block", "sub-block", "super block", etc. are interchangeably used. The terms may have the same meaning or different meanings depending on the context of some example embodiments, and a meaning of each term may be understood depending on the context of some example embodiments to be described.

An open block may refer to a memory block including a word line (hereinafter referred to as a "program word line") connected with programmed memory cells and a word line (hereinafter referred to as an "erase word line") connected with memory cells of an erase state. The open block may include memory cells of the program state and memory cells of the erase state. The memory cells of the program state may be included in (or connected with) the program word line, and the memory cells of the erase state may be included in (or connected with) the erase word line. A close block may refer to a memory block including only word lines connected with programmed memory cells. The close block may include only memory cells of the program state. A free block may refer to a memory block including word lines connected with memory cells of the erase state. The erase block may include only memory cells of the erase state.

In operation S130, the storage device 100 may close the block or super block corresponding to the stream identifier SID. For example, the storage device 100 may perform a dummy program operation on an open block corresponding to the stream identifier SID. The storage controller 110 may send a dummy program command to the nonvolatile memory device 120. The storage controller 110 may close an open memory block by performing programming on all erase word lines of the open memory block in response to the dummy program command. Accordingly, because all the memory cells connected with the word lines of the open block have the program state, the open block may switch into a close block.

In operation S140, the storage device 100 may update stream information. For example, the storage controller 110 may manage stream information in units of stream by using the stream table. The stream information may include RAID information. The stream information may be stored in the buffer memory 115 and may be periodically flushed into the nonvolatile memory device 120.

For example, when the RAID information has a first logical value (e.g., "OFF" or "0"), the storage controller 110 may not apply the RAID manner to a corresponding stream. When the RAID information has a second logical value (e.g., "ON" or "1"), the storage controller 110 may apply the RAID manner to a corresponding stream.

In some example embodiments, the storage controller 110 may set the RAID information corresponding to the stream identifier SID to the enable state in response to the RAID enable request. For example, the storage controller 110 may set the RAID information of the stream table corresponding to the stream identifier SID so as to be changed from the first logical value (e.g., "0") to the second logical value (e.g., "1").

In operation S150, the storage device 100 may send the completion entry to the host 11. For example, the storage controller 110 may write a completion entry (CQE), which provides notification that the operation for the RAID enable request is completed, in the completion queue or admin completion queue of the host 11. Afterwards, the storage controller 110 may send an interrupt signal to the host 11. Through the interrupt signal, the storage controller 110 may notify the host 11 that the completion entry is written in the completion queue.

As described above, the storage system 10 may turn on the RAID settings with respect to a specific stream through the RAID enable request. That is, the storage system 10 may perform a normal write operation on the specific stream before sending the RAID enable request. Afterwards, the storage system 10 may change an RAID option for the specific stream through the RAID enable request. The storage system 10 may perform the RAID write operation on the specific stream after the RAID enable request.

Figure 8:
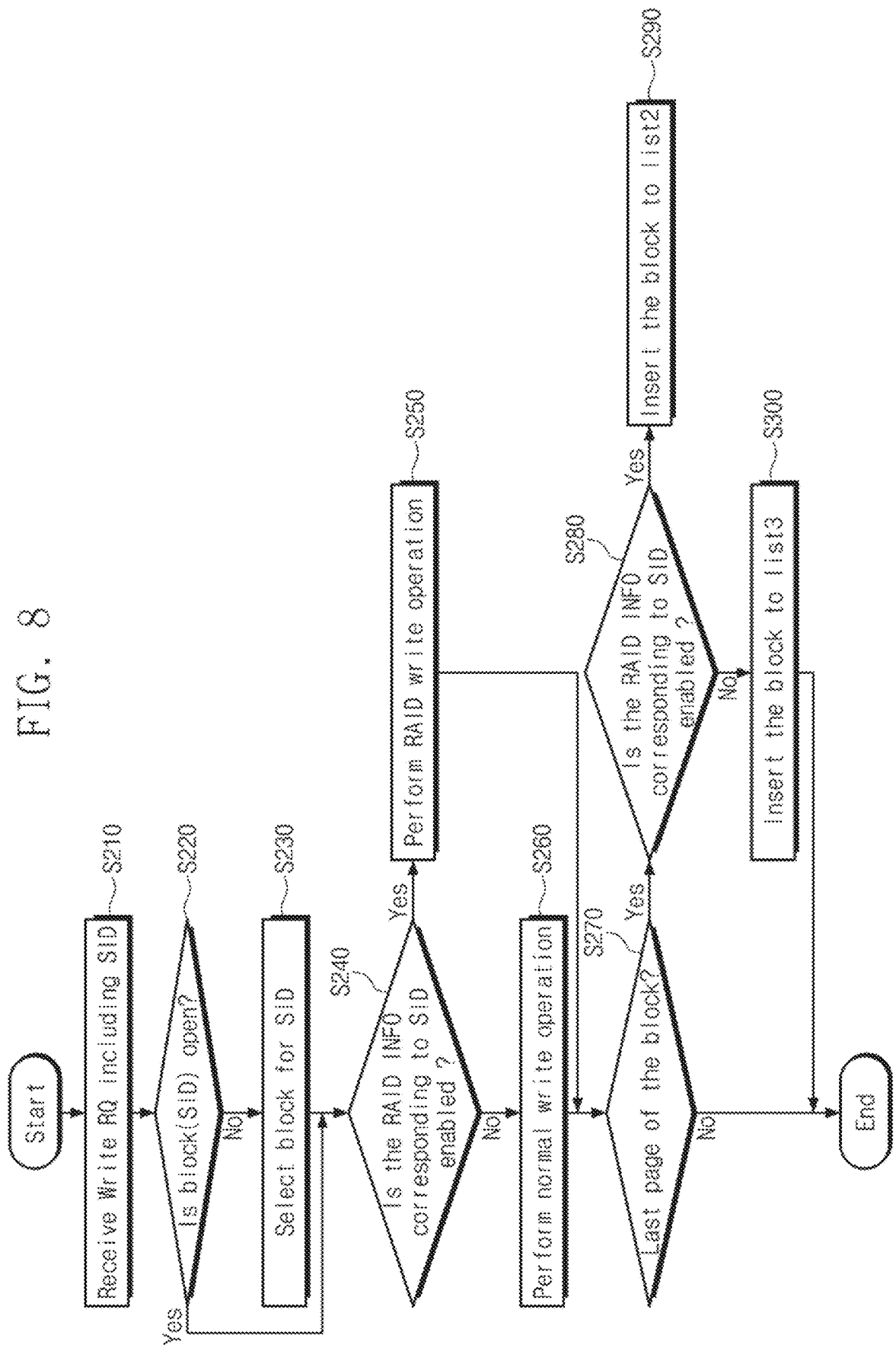
FIG. 8 is a flowchart illustrating an operation method of a storage device of FIG. 1.
Figure 9:
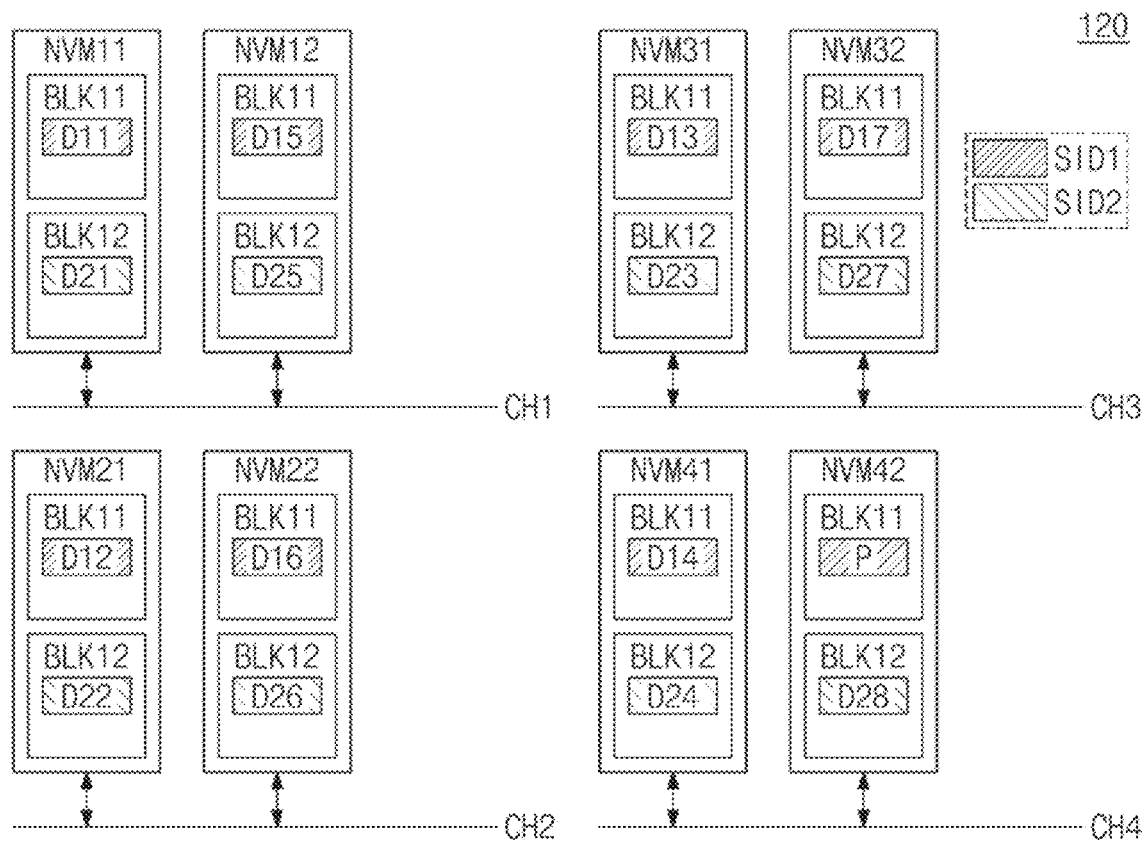
FIG. 9 is a diagram illustrating an example in which a storage device performs a program operation based on the operating method of FIG. 8.

FIG. 8 is a flowchart illustrating an operation method of a storage device of FIG. 1. FIG. 9 is a diagram illustrating an example in which a storage device performs a program operation based on the operating method of FIG. 8.

Referring to FIGS. 1 and 8, in operation S210, the storage device 100 may receive a write request including the stream identifier SID from the host 11. For example, the storage controller 110 may fetch the write request (or a submission queue entry (SQE)) from the host 11. The storage controller 110 may fetch the write request stored in the submission queue (SQ) of the host memory 13. The storage controller 110 may check the stream identifier SID from the received write request.

In operation S220, the storage device 100 may determine whether a block or super block corresponding to the stream identifier SID is an open block. For example, the storage controller 110 may determine whether a block state is an open state, with reference to stream information corresponding to the stream identifier SID. When it is determined that a block corresponding to the stream identifier SID is an open block, the storage device 100 performs operation S240; when it is determined that the block corresponding to the stream identifier SID is not an open block, the storage device 100 performs operation S230.

In operation S230, the storage device 100 may select a new block or super block for the stream identifier SID. For example, the storage controller 110 may select a block or super block in which data corresponding to the write request are to be stored. The storage controller 110 may select a memory block from memory blocks of the erase state. Alternatively or additionally, the storage controller 110 may select a super block from super blocks of the erase state.

In some example embodiments, the storage controller 110 may select a memory block from a first list list1. For example, the first list list1 may be a set or list of free blocks corresponding to the erase state from among a plurality of memory blocks. The storage controller 110 may remove the selected memory block from the first list list1.

In some example embodiments, the storage controller 110 may update metadata for the selected memory block. For example, the metadata may include a variety of information about the selected memory block. The metadata may include an RAID flag. The RAID flag may refer to information about whether the RAID manner is used for data stored in a memory block. In the case where the RAID flag indicates the enable state, data stored in a corresponding memory block may be data stored in the RAID manner. In the case where the RAID flag indicates a disable state, data stored in a corresponding memory block may be data stored in a normal manner.

In some example embodiments, the storage controller 110 may set the RAID flag of the selected memory block. For example, the storage controller 110 may set the RAID flag of the selected memory block, based on the RAID information of the stream identifier SID. In the case where the RAID information of the stream identifier SID indicates the enable state, the storage controller 110 may set the RAID flag of the selected memory block to the enable state. In the case where the RAID information of the stream identifier SID indicates the disable state, the storage controller 110 may set the RAID flag of the selected memory block to the disable state.

In some example embodiments, the storage controller 110 may store the metadata associated with the memory block in the buffer memory 115. The storage controller 110 may store the metadata associated with the selected memory block in a part of the selected memory block. Alternatively or additionally, the storage controller 110 may store the metadata associated with the selected memory block in the remaining space of the nonvolatile memory device 120 other than the selected memory block.

In some example embodiments, the storage controller 110 may associate the selected memory block with the stream identifier SID. For example, the storage controller 110 may store the address of the selected memory block in stream information corresponding to the stream identifier SID.

In operation S240, the storage device 100 may determine whether the RAID information corresponding to the stream identifier SID indicates the enable state. For example, the storage controller 110 may load the RAID information corresponding to the stream identifier SID from the stream table (ST). When the RAID information corresponding to the stream identifier SID indicates the enable state, the storage controller 110 performs operation S250; when the RAID information corresponding to the stream identifier SID indicates the disable state, the storage controller 110 performs operation S260. The storage device 100 may perform the write operation based on the RAID information.

In operation S250, the storage device 100 may perform the RAID write operation. For example, in response to the RAID information of the enable state, the storage controller 110 may store data corresponding to the write request by using the RAID manner. Because the RAID information corresponding to the stream identifier SID indicates the enable state, the storage controller 110 may generate parity data for user data (e.g., the data corresponding to the write request) and may store the user data and the parity data in the nonvolatile memory device 120.

In operation S260, the storage device 100 may perform the normal write operation. For example, in response to the RAID information of the disable state, the storage controller 110 may store data corresponding to the write request without using the RAID manner. Because the RAID information corresponding to the stream identifier SID indicates the disable state, the storage controller 110 may store only the user data in the nonvolatile memory device 120 without generating parity data for the user data.

In operation S270, the storage device 100 may determine whether a page targeted for the write operation is the last page of the selected memory block. When the targeted page is the last page, the storage device 100 may perform operation S280; when the targeted page is not the last page, the storage device 100 may not perform the following operation(s) (e.g., operations S280, S290 and S300).

In operation S280, the storage device 100 may determine whether the RAID information corresponding to the stream identifier SID indicates the enable state. When the RAID information corresponding to the stream identifier SID indicates the enable state, the storage device 100 performs operation S290; when the RAID information corresponding to the stream identifier SID indicates the disable state (e.g., when the RAID information indicates the disable state), the storage device 100 performs operation S300.

In operation S290, the storage device 100 may add or insert the selected memory block to a second list list2. For example, the second list list2 may be a set or list of memory blocks that are memory blocks (e.g., close blocks) corresponding to a close state from among the plurality of memory blocks and in which data are stored in the RAID manner. In response to the RAID information of the enable state, the storage controller 110 may add the selected memory block to the second list list2 being an on-close block list.

In operation S300, the storage device 100 may add or insert the selected memory block to a third list list3. For example, the third list list3 may be a set or list of memory blocks that are close blocks of the plurality of memory blocks and in which data are stored in the normal manner (e.g., without using the RAID manner). In response to the RAID information of the disable state, the storage controller 110 may add the selected memory block to the third list list3 being an off-close block list.

In some example embodiments, after operation S290 and operation S300, the storage device 100 may set the stream information corresponding to the stream identifier SID such that a block state is changed to the close state. As such, in the case of receiving data corresponding to the stream identifier SID later, the storage device 100 may select a new block because the block corresponding to the current stream identifier SID is not an open block.

Referring to FIGS. 1, 8, and 9, it is assumed that the storage device 100 manages the first stream identifier SID1 and the second stream identifier SID2. It is assumed that RAID information of the first stream identifier SID1 indicates the enable state and RAID information of the second stream identifier SID2 indicates the disable state.

The nonvolatile memory device 120 may include a first super block and a second super block. The first super block may include the memory block BLK11 of each of the nonvolatile memories NVM11, NVM12, NVM21, NVM22, NVM31, NVM32, NVM41, and NVM42. The second super block may include the memory block BLK12 of each of the nonvolatile memories NVM11, NVM12, NVM21, NVM22, NVM31, NVM32, NVM41, and NVM42.

The storage controller 110 may receive the write request including the first stream identifier SID1 and data D11. The storage controller 110 may determine whether a super block corresponding to the first stream identifier SID1 is an open block. Because the super block corresponding to the first stream identifier SID1 is not an open block, the storage controller 110 may allocate the first super block to the first stream identifier SID1. The storage controller 110 may store the data D11 in a memory block (e.g., BLK11 of NVM11) of the first super block.

The storage controller 110 may receive the write request including the second stream identifier SID2 and data D21. The storage controller 110 may determine whether a super block corresponding to the second stream identifier SID2 is an open block. Because the super block corresponding to the second stream identifier SID2 is not an open block, the storage controller 110 may allocate the second super block to the second stream identifier SID2. The storage controller 110 may store the data D21 in a memory block (e.g., BLK12 of NVM11) of the second super block.

As described above, in the case where stream identifiers are different, the storage controller 110 supporting the multi-stream (e.g., supporting multiple streams) may store pieces of data in different physical regions (e.g., different blocks or super blocks) in the nonvolatile memory device 120, respectively. That is, even though the first super block is an open block, because a stream identifier (e.g., SID1) of the first super block is different from a stream identifier (e.g., SID2) of the second super block, the data D21 may be stored in the second super block, not in the first super block.

The storage controller 110 may receive the write request including the first stream identifier SID1 and data D12. Because the super block corresponding to the first stream identifier SID1 is an open block, the storage controller 110 may store the data D12 in a memory block (e.g., BLK11 of NVM21) of the first super block. The remaining data D13 to D17 are similar to the data D12, and thus, additional description will be omitted to avoid redundancy.

Because the RAID information of the first stream identifier SID1 indicates the enable state, the storage controller 110 may generate the parity data "P" and may store the parity data "P" in a memory block (e.g., BLK11 of NVM42) of the first super block.

The storage controller 110 may receive the write request including the second stream identifier SID2 and data D22. Because the super block corresponding to the second stream identifier SID2 is an open block, the storage device 100 may store the data D22 in a memory block (e.g., BLK12 of NVM21) of the second super block. The remaining data D23 to D28 are similar to the data D22, and thus, additional description will be omitted to avoid redundancy.

Because the RAID information of the second stream identifier SID2 indicates the disable state, the storage controller 110 may not generate parity data and may not store parity data in the nonvolatile memory device 120.

As described above, because the RAID information is managed in units of stream, data corresponding to a first stream identifier may be stored in the RAID manner, and data corresponding to a second stream identifier may be stored in the normal manner.

Figure 10:
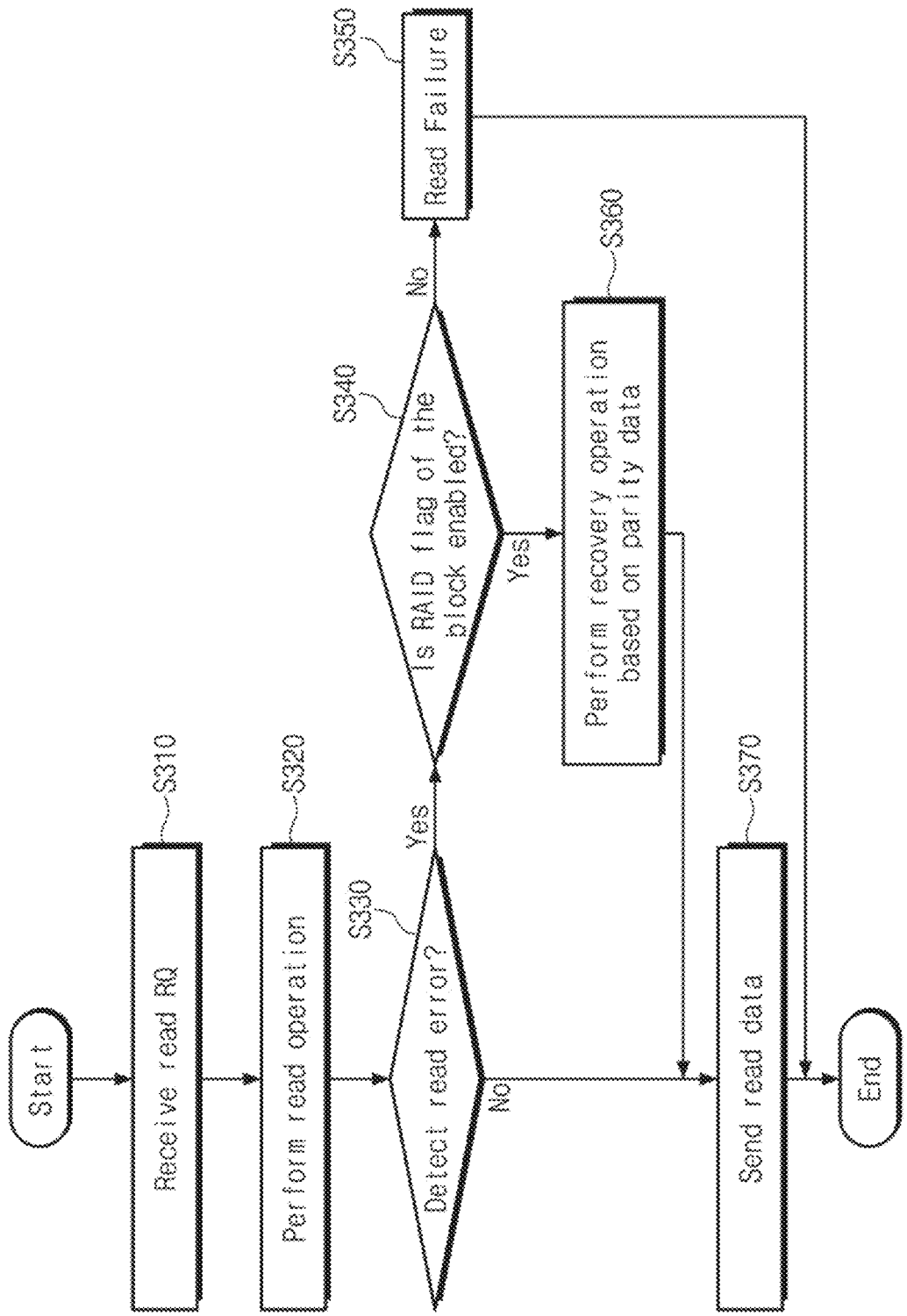
FIG. 10 is a flowchart illustrating an operation method of a storage device of FIG. 1.
Figure 11:
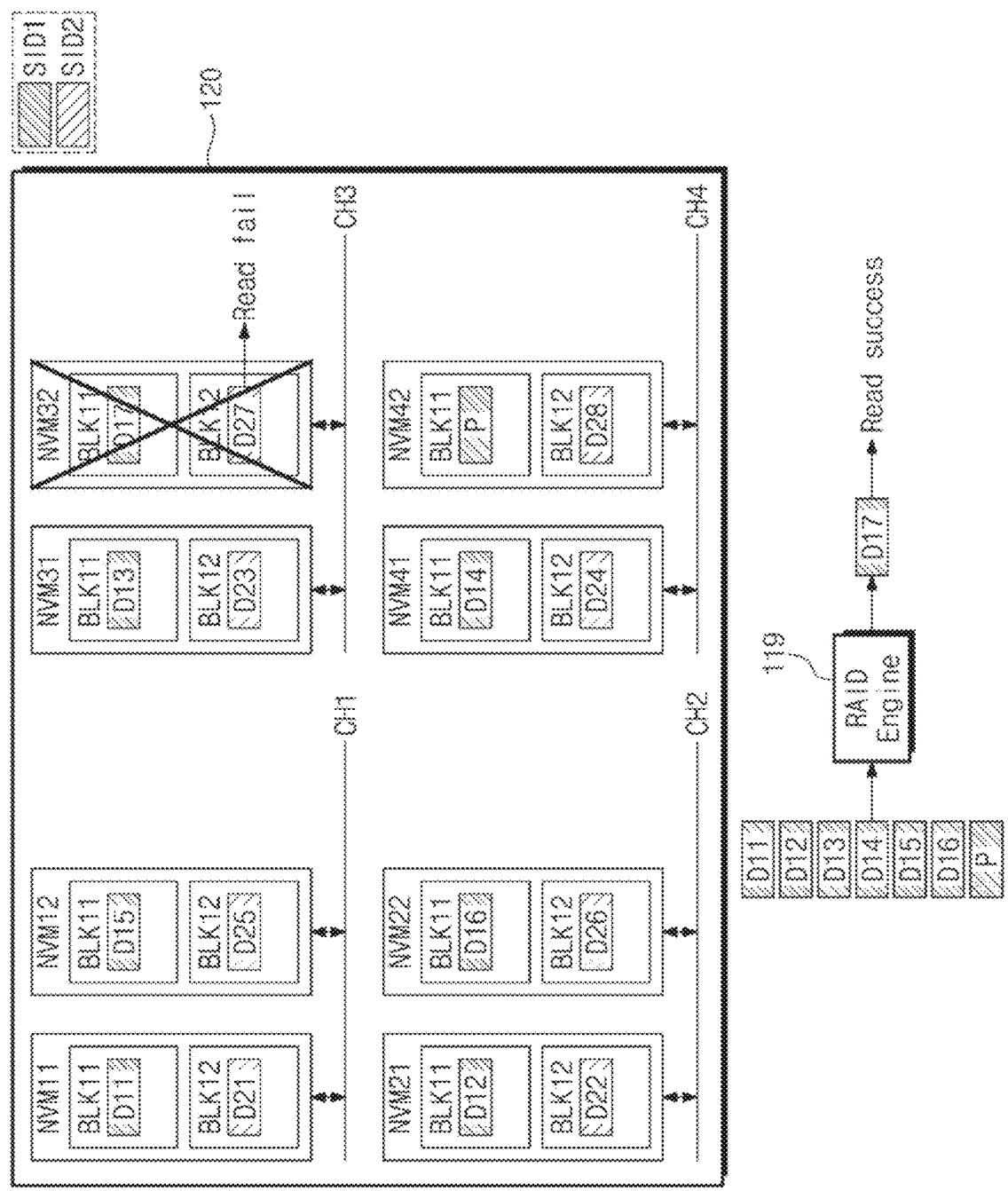
FIG. 11 is a diagram illustrating an example in which a storage device performs a read operation based on the operating method of FIG. 10.

FIG. 10 is a flowchart illustrating an operation method of a storage device of FIG. 1. FIG. 11 is a diagram illustrating an example in which a storage device performs a read operation based on the operating method of FIG. 10. It is assumed that the data D17 and the data D27 stored in the nonvolatile memory NVM32 connected with the third channel CH3 are lost or damaged.

Referring to FIGS. 1, 10, and 11, in operation S310, the storage device 100 may receive a read request from the host 11. For example, the storage controller 110 may fetch the read request stored in the submission queue (SQ) of the host memory 13. For example, the storage controller 110 may receive a first read request including an address corresponding to the data D17. The storage controller 110 may receive a second read request including an address corresponding to the data D27. According to some example embodiments, the read request may include an address corresponding to the data and a stream identifier corresponding to the data.

In operation S320, the storage device 100 may perform the read operation. For example, in response to the read request, the storage controller 110 may read data corresponding to the received read request (or the address included in the read request) from the nonvolatile memory device 120. The storage controller 110 may perform an address translation operation to select a physical address of the nonvolatile memory device 120 corresponding to the address (e.g., a logical address) included in the read request. The storage controller 110 may read data stored in a region corresponding to the selected physical address. The FTL 112 may manage the address translation operation through a mapping table.

For example, the storage controller 110 may select a first physical address based on a first logical address included in the first read request. The storage controller 110 may read the data D17 stored in a region corresponding to the first physical address. The storage controller 110 may select a second physical address based on a second logical address included in the second read request. The storage controller 110 may read the data D27 stored in a region corresponding to the second physical address.

In operation S330, the storage device 100 may determine whether a read error is detected. For example, the storage controller 110 may detect an error of the read data provided from the nonvolatile memory device 120. When an error is detected from the read data, the storage controller 110 performs operation S340; when an error is not detected from the read data, the storage controller 110 performs operation S370.

For example, the storage controller 110 may detect an error of the data D17 read out in response to the first read request and may detect an error of the data D27 read out in response to the second read request.

In operation S340, the storage device 100 may determine whether an RAID flag of a memory block in which the read data are stored indicates the enable state. For example, the storage controller 110 may load metadata corresponding to the memory block, in which the read data are stored, from the buffer memory 115. Alternatively or additionally, the storage controller 110 may load the metadata from the nonvolatile memory device 120. The storage controller 110 may check the RAID flag included in the metadata.

In some example embodiments, the storage controller 110 may determine whether to recover the read data based on the RAID flag. For example, when the RAID flag indicates the disable state, the storage controller 110 performs operation S350; when the RAID flag indicates the enable state, the storage controller 110 performs operation S360.

For example, the storage controller 110 may load metadata of the first super block in response to error detection associated with the first read request. The storage controller 110 may check a first RAID flag of the metadata corresponding to the first data D17. The storage controller 110 may recognize the first RAID flag as indicating the enable state.

The storage controller 110 may load metadata of the second super block in response to error detection associated with the second read request. The storage controller 110 may check a second RAID flag of the metadata corresponding to the second data D27. The storage controller 110 may recognize the second RAID flag as indicating the disable state.

In operation S350, the storage device 100 may determine that the read operation fails and may send information about the read failure to the host 11. For example, because the RAID flag indicates the disable state, the storage controller 110 may recognize that data are stored in the normal manner. As such, because parity data are absent, the storage controller 110 fails to perform a data recovery operation. The storage controller 110 may determine that the read operation corresponding to the read request fails and may send a completion entry including the information about the read failure to the host 11.

For example, in response to the second RAID flag indicating the disable state, the storage controller 110 may recognize that the second super block does not use the RAID manner. As such, the storage controller 110 may determine that the read operation corresponding to the read request fails and may send a completion entry including the information about the read failure to the host 11.

In operation S360, the storage device 100 may perform a recovery operation based on parity data. For example, the storage controller 110 may check a stripe including data from which an error is detected. The storage controller 110 may read the remaining unit data and parity data included in the stripe from the nonvolatile memory device 120. The storage controller 110 may recover data based on the remaining unit data and the parity data.

For example, in response to the first RAID flag indicating the enable state, the storage controller 110 may recognize that the first super block uses the RAID manner. As such, the storage controller 110 may read the remaining unit data D11 to D16 and the parity data "P". The RAID engine 119 of the storage controller 110 may recover the data D17 by performing the recovery operation based on the remaining unit data D11 to D16 and the parity data "P".

In operation S370, the storage device 100 may send the read data to the host 11. For example, the storage controller 110 may write the data read from the nonvolatile memory device 120 in the host memory 13. The storage controller 110 may write a completion entry corresponding to the read request in the completion queue. Afterwards, the storage controller 110 may send an interrupt signal to the host 11.

Figure 12:
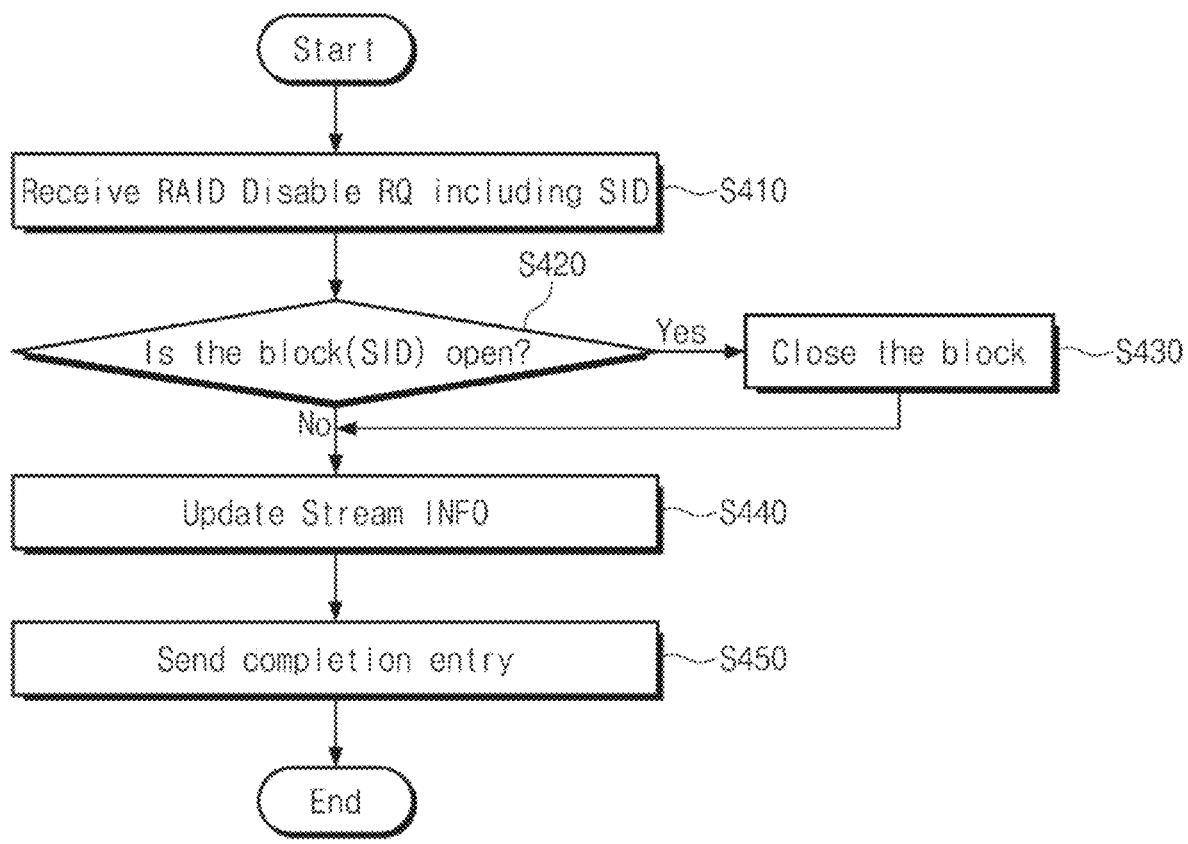
FIG. 12 is a flowchart illustrating an example of an operation method of a storage device of FIG. 1.

FIG. 12 is a flowchart illustrating an example of an operation method of a storage device of FIG. 1. Referring to FIGS. 1 and 12, in operation S410, the storage device 100 may receive the RAID disable request including the stream identifier SID from the host 11. For example, the storage controller 110 may fetch the RAID disable request, the RAID disable request being an admin command from the admin submission queue (ASQ) of the host memory 13. Alternatively or additionally, the storage controller 110 may fetch the RAID disable request, the RAID disable request being an input/output command from the submission queue (SQ) of the host memory 13. The storage controller 110 may check the stream identifier SID from the received RAID disable request.

In operation S420, the storage device 100 may determine whether a block or super block corresponding to the stream identifier SID is an open block. For example, when it is determined that a block corresponding to the stream identifier SID included in the RAID disable request is an open block, the storage controller 110 performs operation S430; when it is determined that the block corresponding to the stream identifier SID is not an open block, the storage device 100 performs operation S440.

In operation S430, the storage device 100 may close the block or super block corresponding to the stream identifier SID. For example, the storage controller 110 may perform the dummy program operation on the open block corresponding to the stream identifier SID. The storage controller 110 may close the open block of the nonvolatile memory device 120 through the dummy program command. The dummy program command may be included in the program command.

In operation S440, the storage device 100 may update stream information. For example, in response to the RAID disable request, the storage controller 110 may set the RAID information belonging to the stream information corresponding to the stream identifier SID to the disable state. For example, the storage controller 110 may set the RAID information corresponding to the stream identifier SID so as to be changed from the second logical value (e.g., "1") to the first logical value (e.g., "0").

As such, in the case where a write request for data corresponding to the stream identifier SID is received later, the storage controller 110 may not use the RAID manner with respect to the data corresponding to the stream identifier SID because the RAID information indicates the disable state. That is, the storage controller 110 may perform the normal write operation on the data corresponding to the stream identifier SID.

In operation S450, the storage device 100 may send a completion entry to the host 11. For example, the storage controller 110 may write a completion entry, which provides notification that the operation for the RAID disable request is completed, in the completion queue or admin completion queue of the host 11. The storage controller 110 may send an interrupt signal to the host 11.

Figure 13:
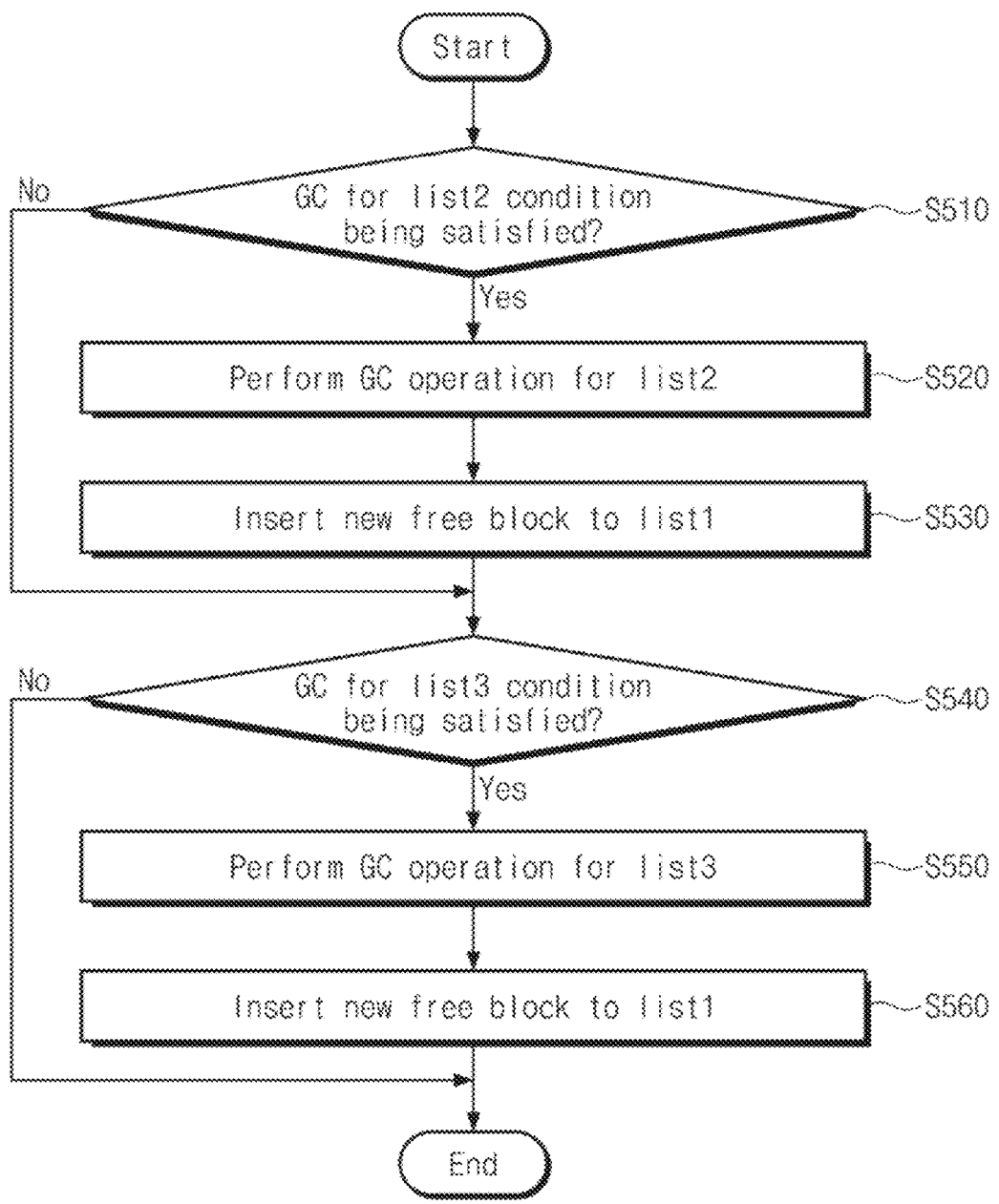
FIG. 13 is a flowchart illustrating an operation method of a storage device of FIG. 1.
Figure 14:
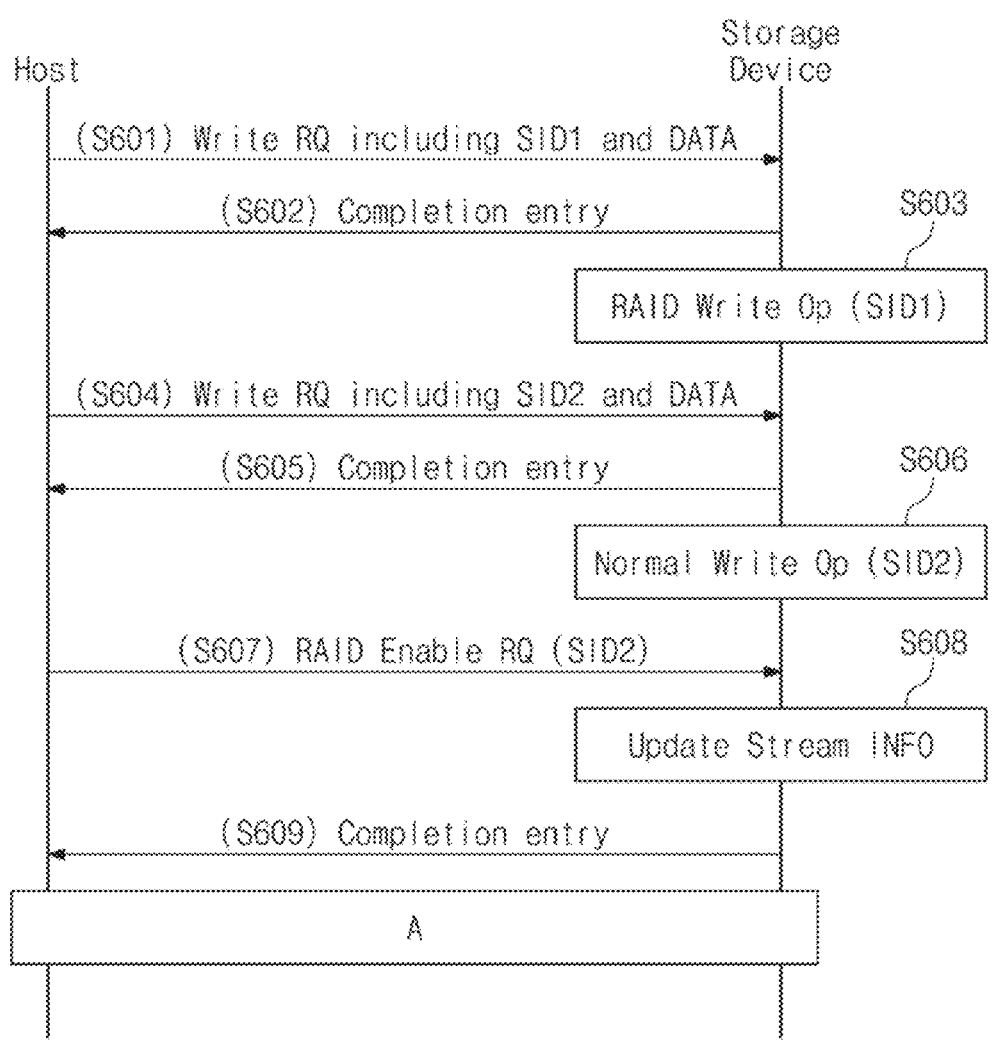
FIGS. 14 to 16C are diagrams illustrating an example of an operation method of a storage system of FIG. 1.
Figure 15:
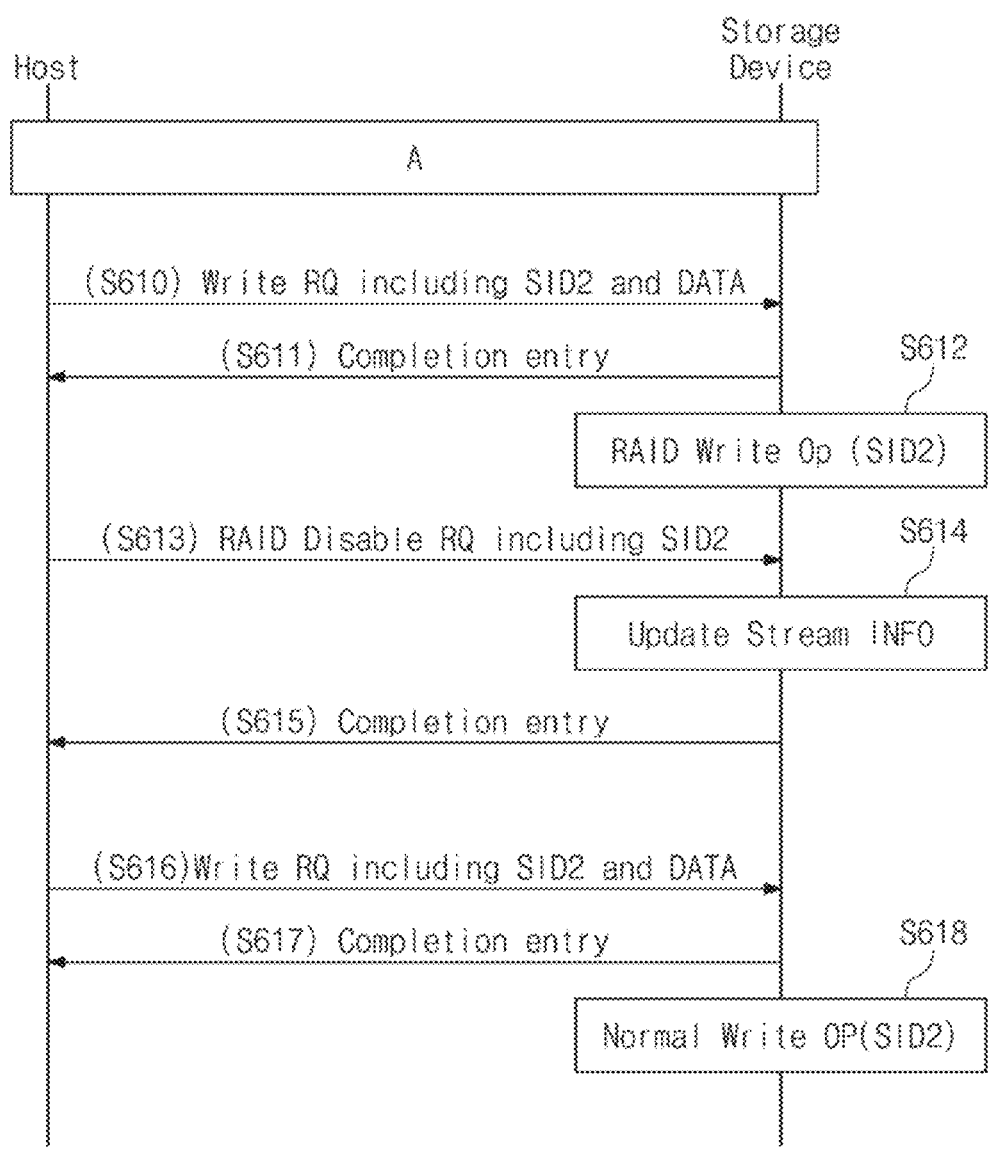

FIG. 13 is a flowchart illustrating an operation method of a storage device of FIG. 1. Referring to FIGS. 1 and 13, in operation S510, the storage device 100 may determine whether a garbage collection condition for the second list list2 is satisfied. When the number of free blocks is less than a threshold value, the garbage collection condition may be satisfied. However, the present disclosure is not limited thereto.

In some example embodiments, when it is determined that the garbage collection condition for the second list list2 is satisfied, the storage device 100 performs operation S520; when it is determined that the garbage collection condition for the second list list2 is not satisfied, the storage device 100 performs operation S540.

In operation S520, the storage device 100 may perform the garbage collection operation associated with the second list list2. For example, the storage controller 110 may select memory blocks, in which the number of valid pages is the smallest, from among close blocks included in the second list list2. The storage controller 110 may remove the selected memory blocks from the second list list2. The storage controller 110 may store the valid pages stored in the selected memory blocks in a new free block. After all the valid pages are stored in the new free block, the storage controller 110 may perform an erase operation on the selected memory blocks to generate free blocks.

In operation S530, the storage device 100 may add or insert the new free blocks to the first list list1. In operation S540, the storage device 100 may determine whether a garbage collection condition for the third list list3 is satisfied. When it is determined that the garbage collection condition for the third list list3 is satisfied, the storage device 100 performs operation S550; when it is determined that the garbage collection condition for the third list list3 is not satisfied, the storage device 100 may not perform the following operation(s) (e.g., operations S550 and S560).

In operation S550, the storage device 100 may perform the garbage collection operation associated with the third list list3. For example, the storage controller 110 may select memory blocks, in which the number of valid pages is the smallest, from among close blocks included in the third list list3. The storage controller 110 may remove the selected memory blocks from the third list list3. The storage controller 110 may store the valid pages stored in the selected memory blocks in a new free block. After all the valid pages are stored in the new free block, the storage controller 110 may perform an erase operation on the selected memory blocks to generate free blocks. In operation S560, the storage device 100 may add or insert the new free blocks to the first list list1.

As described above, the storage controller 110 may manage close blocks based on an RAID flag (e.g., whether to use the RAID manner). The storage controller 110 may perform the garbage collection operation based on the RAID flag. For example, the storage controller 110 may manage close blocks, in which data written in the RAID manner are stored, by using the second list list2 and may manage close blocks, in which data written in the normal manner are stored, by using the third list list3. The storage controller 110 may not perform the garbage collection operation on all the close blocks. That is, the storage controller 110 may perform the garbage collection operation between the close blocks in which data written in the RAID manner are stored and may perform the garbage collection operation between the close blocks in which data written in the normal manner are stored.

FIGS. 14 to 16C are diagrams illustrating an example of an operation method of a storage system of FIG. 1. It is assumed that the storage device 100 manages the first stream identifier SID1 and the second stream identifier SID2. It is assumed that RAID information of the first stream identifier SID1 indicates the enable state and RAID information of the second stream identifier SID2 indicates the disable state.

The nonvolatile memory device 120 may include a first super block, a second super block, a third super block, and a fourth super block. The first super block may include the memory block BLK11 of each of the nonvolatile memories NVM11, NVM12, NVM21, NVM22, NVM31, NVM32, NVM41, and NVM42. The second super block may include the memory block BLK12 of each of the nonvolatile memories NVM11, NVM12, NVM21, NVM22, NVM31, NVM32, NVM41, and NVM42. The third super block may include the memory block BLK13 of each of the nonvolatile memories NVM11, NVM12, NVM21, NVM22, NVM31, NVM32, NVM41, and NVM42. The fourth super block may include the memory block BLK14 of each of the nonvolatile memories NVM11, NVM12, NVM21, NVM22, NVM31, NVM32, NVM41, and NVM42.

Referring to FIGS. 1, 14, 15, and 16A, in operation S601, the host 11 may send a first write request including the first stream identifier SID1 and the data D11 to D17 to the storage device 100. In operation S602, the storage device 100 may send a completion entry to the host 11 in response to the first write request.

In operation S603, the storage device 100 may perform the RAID write operation on the data corresponding to the first write request. For example, the storage controller 110 may check the first stream identifier SID1 from the first write request. The storage controller 110 may determine that RAID information corresponding to the first stream identifier SID1 indicates the enable state. Because the RAID information has the second logical value (e.g., "1"), the storage controller 110 may perform the RAID write operation on the data D11 to D17 corresponding to the first write request. The storage controller 110 may generate first parity data P1 for the data D11 to D17. The storage controller 110 may allocate a first super block to the first stream identifier SID1 and may store the data D11 to D17 and the first parity data P1 in the first super block.

For example, the storage controller 110 may store the data D11 in the memory block BLK11 of the nonvolatile memory NVM11, may store the data D12 in the memory block BLK11 of the nonvolatile memory NVM21, may store the data D13 in the memory block BLK11 of the nonvolatile memory NVM31, may store the data D14 in the memory block BLK11 of the nonvolatile memory NVM41, may store the data D15 in the memory block BLK11 of the nonvolatile memory NVM12, may store the data D16 in the memory block BLK11 of the nonvolatile memory NVM22, may store the data D17 in the memory block BLK11 of the nonvolatile memory NVM32, and may store the first parity data P1 in the memory block BLK11 of the nonvolatile memory NVM42.

In operation S604, the host 11 may send a second write request including the second stream identifier SID2 and the data D21 to D25 to the storage device 100. In operation S605, the storage device 100 may send a completion entry to the host 11 in response to the second write request. In operation S606, the storage device 100 may perform the normal write operation on the data corresponding to the second write request. For example, the storage controller 110 may check the second stream identifier SID2 from the second write request. The storage controller 110 may determine that RAID information corresponding to the second stream identifier SID2 indicates the disable state. Because the RAID information has the first logical value (e.g., "0"), the storage device 100 may perform the normal write operation on the data D21 to D25 corresponding to the second write request. The storage controller 110 may allocate a second super block to the second stream identifier SID2 and may store the data D21 to D25 in the second super block.

For example, the storage controller 110 may store the data D21 in the memory block BLK12 of the nonvolatile memory NVM11, may store the data D22 in the memory block BLK12 of the nonvolatile memory NVM21, may store the data D23 in the memory block BLK12 of the nonvolatile memory NVM31, may store the data D24 in the memory block BLK12 of the nonvolatile memory NVM41, and may store the data D25 in the memory block BLK12 of the nonvolatile memory NVM12.

Figure 16A:
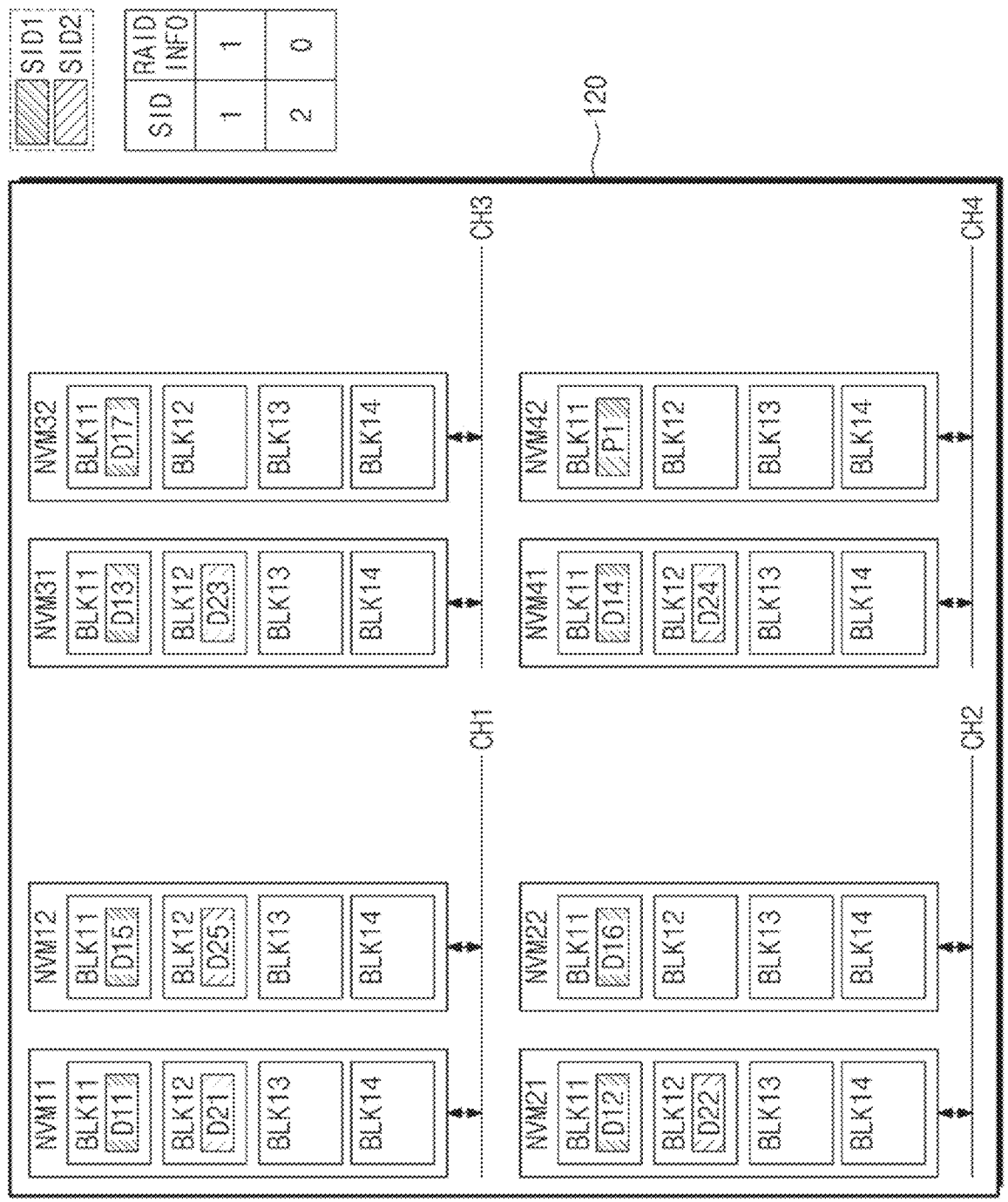
Figure 16B:
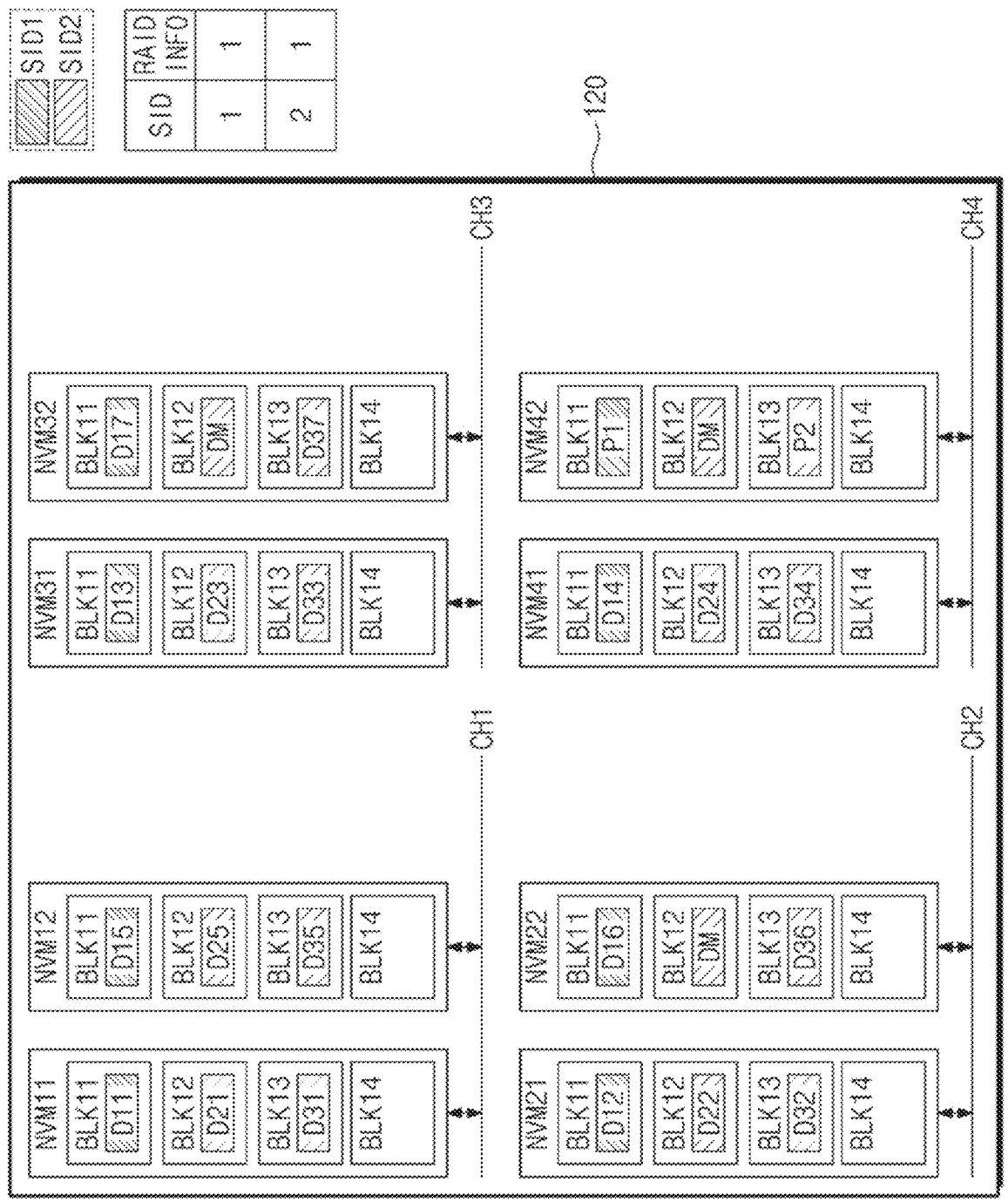

In operation S607, the host 11 may send the RAID enable request including the second stream identifier SID2 to the storage device 100. In operation S608, the storage device 100 may update stream information in response to the RAID enable request. Referring to FIG. 16B, the storage controller 110 may set the RAID information belonging to the stream information corresponding to the second stream identifier SID2 to the enable state. The storage controller 110 may set the RAID information so as to be changed from the first logical value (e.g., "0") to the second logical value (e.g., "1").

In some example embodiments, because the second super block corresponding to the second stream identifier SID2 is an open block, the storage controller 110 may close the second super block corresponding to the second stream identifier SID2 in response to the RAID enable request. For example, the storage controller 110 may perform the dummy program operation on the second super block. The storage controller 110 may write dummy data (illustrated in FIGS. 16B and 16C as "DM") in the memory blocks BLK12 of the nonvolatile memories NVM22, NVM32, and NVM42, respectively.

In operation S609, the storage device 100 may send a completion entry to the host 11 in response to the RAID enable request. In operation S610, the host 11 may send a third write request including the second stream identifier SID2 and data D31 to D37 to the storage device 100. In operation S611, the storage device 100 may send a completion entry to the host 11 in response to the third write request.

In operation S612, the storage device 100 may perform the RAID write operation on the data corresponding to the third write request. For example, the storage controller 110 may check the second stream identifier SID2 from the third write request. The storage controller 110 may determine that RAID information corresponding to the second stream identifier SID2 indicates the enable state. Because the RAID information has the second logical value (e.g., "1"), the storage controller 110 may perform the RAID write operation on the data D31 to D37 corresponding to the third write request. The storage controller 110 may generate second parity data P2 for the data D31 to D37. The storage controller 110 may allocate a third super block to the second stream identifier SID2 and may store the data D31 to D37 and the second parity data P2 in the third super block.

For example, the storage controller 110 may store the data D31 in the memory block BLK13 of the nonvolatile memory NVM11, may store the data D32 in the memory block BLK13 of the nonvolatile memory NVM21, may store the data D33 in the memory block BLK13 of the nonvolatile memory NVM31, may store the data D34 in the memory block BLK13 of the nonvolatile memory NVM41, may store the data D35 in the memory block BLK13 of the nonvolatile memory NVM12, may store the data D36 in the memory block BLK13 of the nonvolatile memory NVM22, may store the data D37 in the memory block BLK13 of the nonvolatile memory NVM32, and may store the second parity data P2 in the memory block BLK13 of the nonvolatile memory NVM42.

Figure 16C:
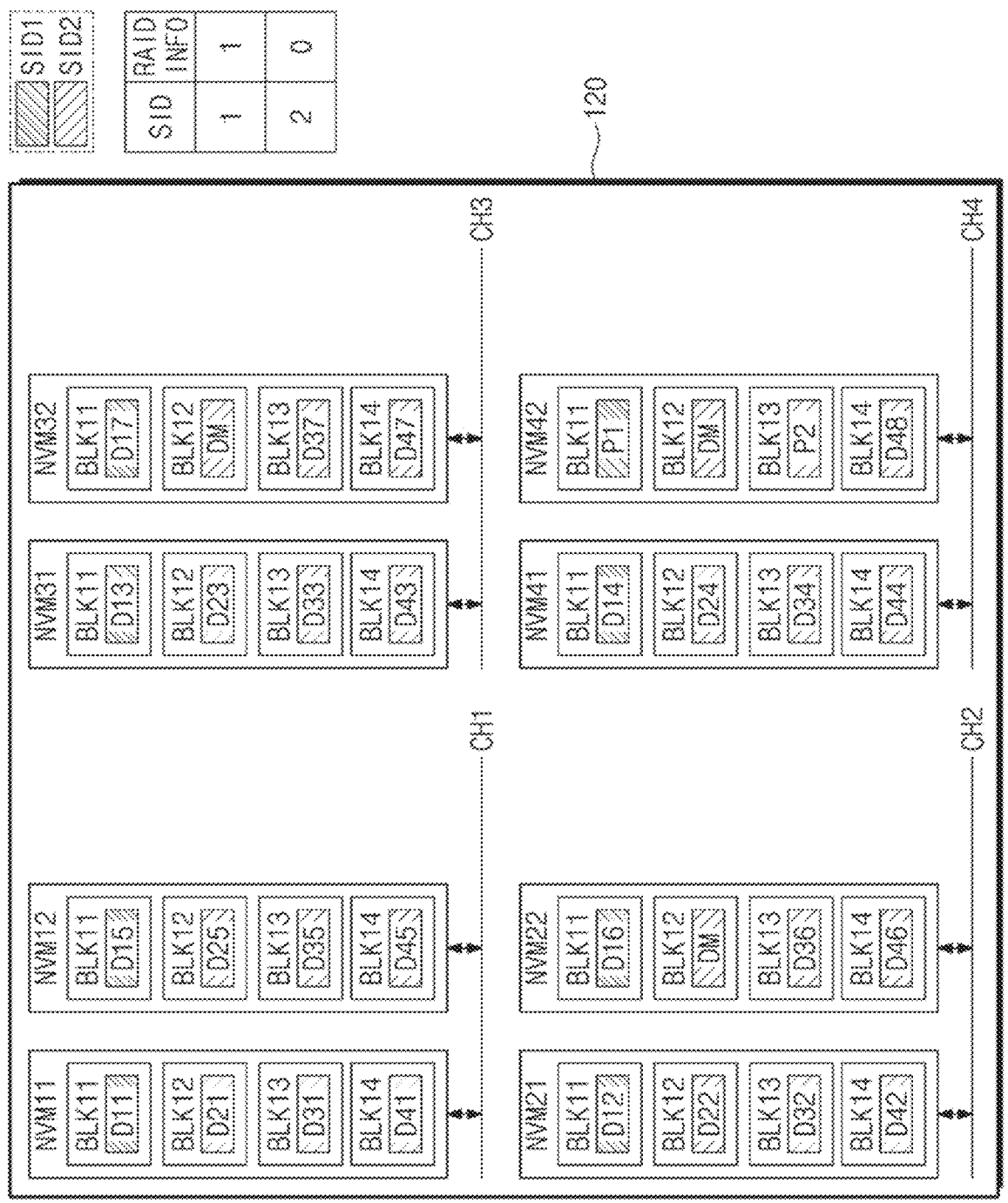

In operation S613, the host 11 may send the RAID disable request including the second stream identifier SID2 to the storage device 100. In operation S614, the storage device 100 may update stream information in response to the RAID disable request. Referring to FIG. 16C, the storage controller 110 may check the second stream identifier SID2 from the RAID disable request. The storage controller 110 may set the RAID information belonging to the stream information corresponding to the second stream identifier SID2 to the disable state. The storage controller 110 may set the RAID information so as to be changed from the second logical value (e.g., "1") to the first logical value (e.g., "0"). In operation S615, the storage device 100 may send a completion entry to the host 11 in response to the RAID disable request.

In operation S616, the host 11 may send a fourth write request including the second stream identifier SID2 and data D41 to D48 to the storage device 100. In operation S617, the storage device 100 may send a completion entry to the host 11 in response to the fourth write request.

In operation S618, the storage device 100 may perform the normal write operation on the data corresponding to the fourth write request. For example, the storage controller 110 may check the second stream identifier SID2 from the fourth write request. The storage controller 110 may determine that RAID information corresponding to the second stream identifier SID2 indicates the disable state. Because the RAID information has the first logical value (e.g., "0"), the storage controller 110 may perform the normal write operation on the data D41 to D48 corresponding to the fourth write request. The storage controller 110 may allocate a fourth super block to the second stream identifier SID2 and may store the data D41 to D48 in the fourth super block.

For example, the storage controller 110 may store the data D41 in the memory block BLK14 of the nonvolatile memory NVM11, may store the data D42 in the memory block BLK14 of the nonvolatile memory NVM21, may store the data D43 in the memory block BLK14 of the nonvolatile memory NVM31, may store the data D44 in the memory block BLK14 of the nonvolatile memory NVM41, may store the data D45 in the memory block BLK14 of the nonvolatile memory NVM12, may store the data D46 in the memory block BLK14 of the nonvolatile memory NVM22, may store the data D47 in the memory block BLK14 of the nonvolatile memory NVM32, and may store the data 48 in the memory block BLK14 of the nonvolatile memory NVM42.

FIG. 17 is a diagram illustrating an example of a write request. Referring to FIG. 17, an NVM Express (NVMe) interface that is a register level interface will be described as an example of a format of a write request. However, it may be well understood that this example is only for convenience of description. In the NVMe protocol, basically, the request (or command) may be arranged in a 32-bit (Dword) unit. The write request (or write command) may include first to sixteenth double words Dword0 to Dword15. The first double word Dword0 may include various elements CID, PSDT, FUSE, and OPC. For example, "CID (Command ID)" indicates a command identifier, "PSDT (PRP or SGL for Data Transfer)" indicates data transfer information, "FUSE" indicates whether to execute a command set in an atomic unit, "OPC (Opcode)" indicates a code value (e.g., operation code) specifying operation attributes of a command. For example, the operation code OPC of the write request may be "01b", and the operation code OPC of the read request may be "10b".

The second double word Dword1 includes "NSID (Namespace ID)" being an identifier of a namespace. The fifth and sixth double words Dword4 and Dword5 include "MPTR (Metadata Pointer)" indicating information about an address of metadata. The seventh to tenth double words Dword6 to Dword9 include "DPTR (Data Pointer)" indicating information about an address of data. The eleventh and twelfth double words Dword10 and Dword11 include "SLBA (Starting LBA)" indicating a start logical address.

The thirteenth double word Dword12 may include various elements LR, FUA, PRINFO, STC, DTYPE, and NLB. "LR" (Limited Retry) indicates information about error recovery try. "FUA (Force Unit Access)" indicates whether data are stored in a nonvolatile memory device before sending a completion entry. "PRINFO (Protection Information Field)" indicates protection information. "STC (Storage Tag Check)" indicates information about whether a storage tag is checked. "DTYPE (Directive Type)" indicates information about a directive type. "NLB (Number of Logical Blocks)" indicates information about a data size.

The fourteenth double word Dword13 may include "DSPEC" and "DSM". "DSPEC (Directive Specific)" indicates a directive specific value (e.g., a directive value) according to a directive type, "DSM (Dataset Management)" indicates attributes of data.

The sixteenth double word Dword15 may include "LBATM" and "LBAT". "LBATM (Logical Block Application Tag Mask)" indicates information about an application tag mask value, "LBAT (Logical Block Application Tag)" indicates information about an application tag value.

In the NVMe protocol, the host 11 may exchange information with the storage device 100 by using a directive mechanism. The host 11 may receive data associated with a directive type from the storage device 100 through a directive receive command. The host 11 may send data associated with a directive type to the storage device 100 through a directive send command. The directive type may include identify and streams. A value of the directive type associated with the identify may be "00h", and a value of the directive type associated with the stream may be "01h".

In some example embodiments, the host 11 may send an input/output request (e.g., a write request) including the stream identifier SID to the storage device 100. The host 11 may send the stream identifier SID through the "DTYPE" and the "DSPEC". For example, the host 11 may set a directive type DTYPE of the write request so as to indicate a stream (e.g., "01h"), and may set the directive value DSPEC so as to indicate the stream identifier SID (or a value of the stream identifier SID). The storage device 100 may determine the stream identifier SID based on the directive type DTYPE and the directive value DSPEC in the write request.

Figure 18:
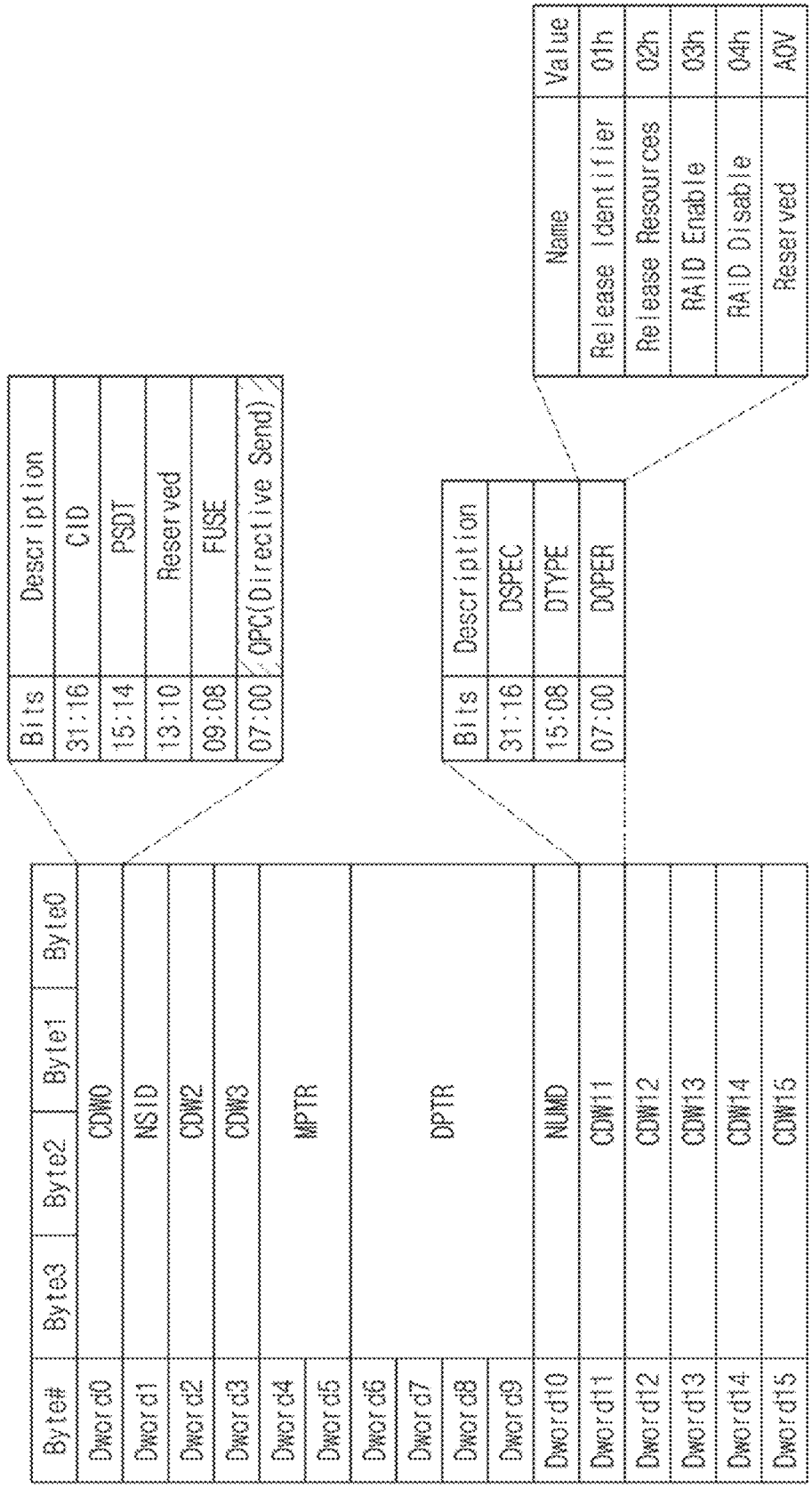
FIGS. 18 to 20 are diagrams illustrating examples of an RAID setting request.
Figure 19:
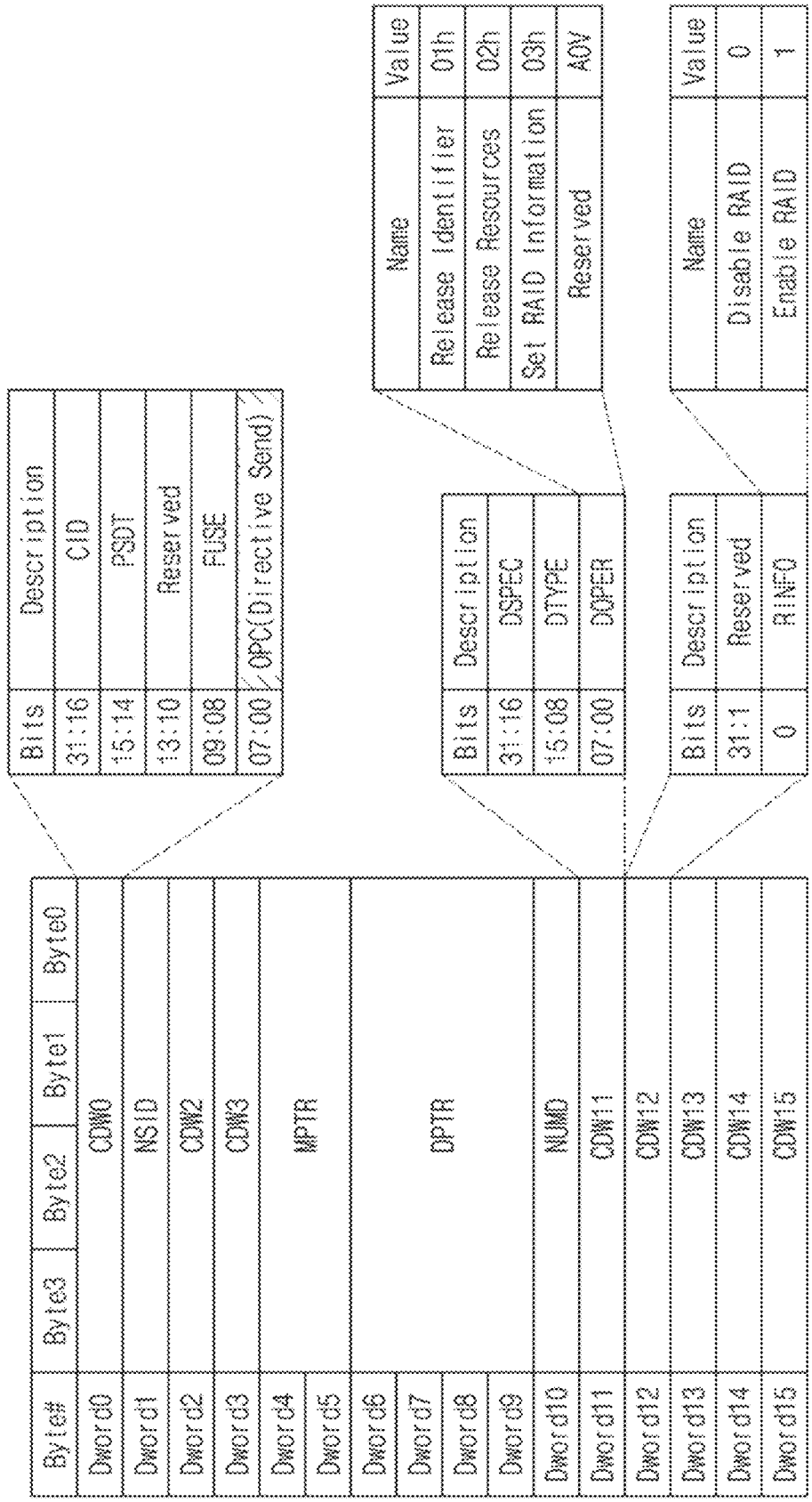
Figure 20:
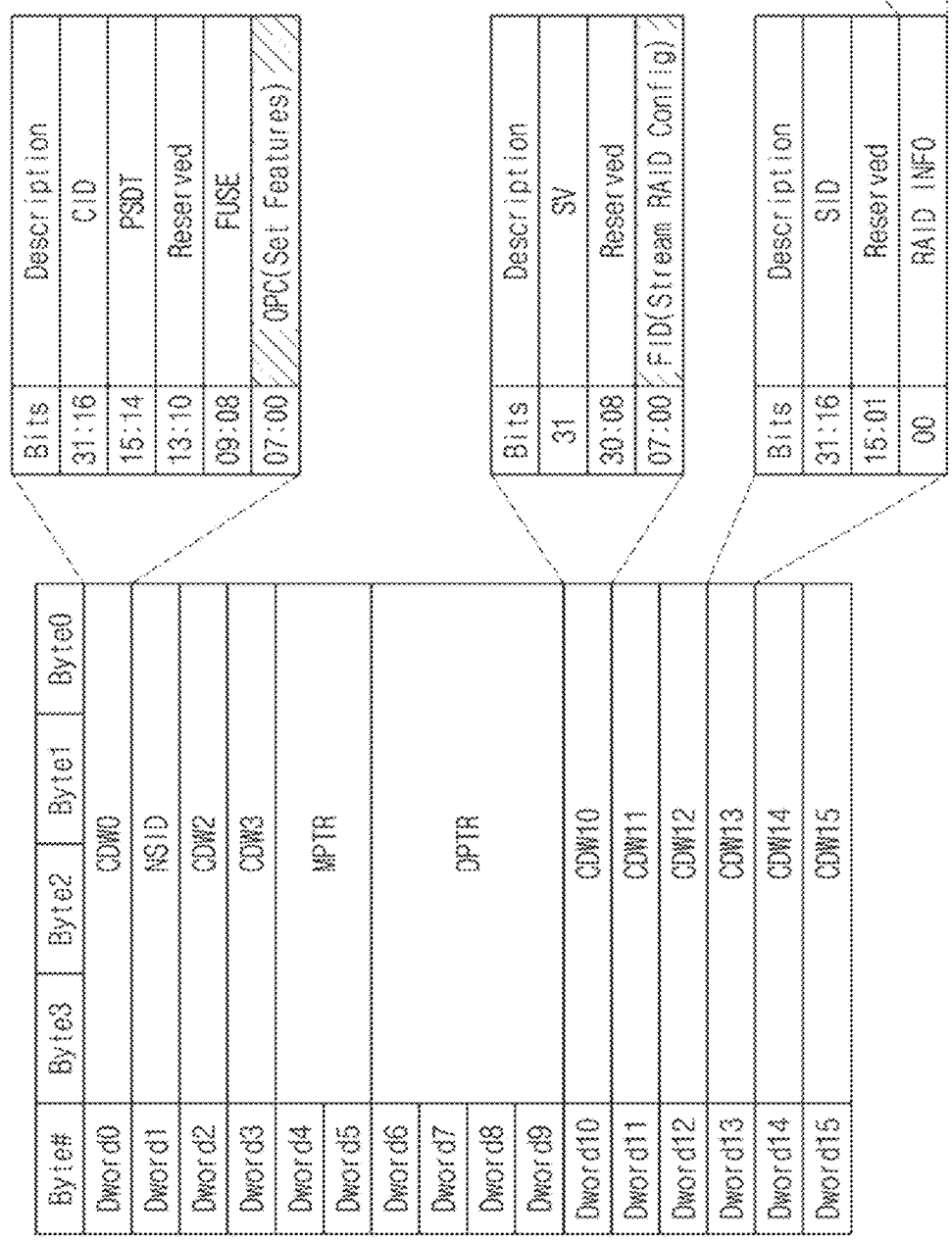

FIGS. 18 to 20 are diagrams illustrating examples of an RAID setting request. Referring to FIGS. 18 to 20, an NVM Express (NVMe) interface that is a register level interface will be described as an example of a format of a write request. However, it may be well understood that this example is only for convenience of description.

In some example embodiments, the host 11 may send the RAID setting request to storage device 100. For example, to turn on the RAID option associated with a specific stream, the host 11 may send an RAID enable request including the stream identifier SID corresponding to the specific stream to the storage device 100. To turn off the RAID option associated with the specific stream, the host 11 may send an RAID disable request including the stream identifier SID corresponding to the specific stream to the storage device 100.

Referring to FIG. 18, the RAID setting request may be a directive send command. The host 11 may set whether to apply the RAID of the storage device 100 to the specific stream through the directive send command. The directive send command may include first to sixteenth double words Dword0 to Dword15. For convenience of description, additional description associated with the elements described above will be omitted to avoid redundancy.

The directive send command may be an admin command, and the operation code of the directive send command may be "19h". The twelfth double word Dword11 may include "DSPEC", "DTYPE", and "DOPER". "DOPER (Directive Operation)" indicates a directive operation.

The directive operation DOPER may include a release identifier, a release resource, RAID enable, and RAID disable A value of the release identifier may be "01h", a value of the release resource may be "02h", a value of the RAID enable may be "03h", and a value of the RAID disable may be "04h".

In some example embodiments, the host 11 may send the RAID enable request to storage device 100. The RAID enable request may be a directive send command. The host 11 may set an operation code of the admin command to directive transfer (e.g., "19b"), may set the directive value DSPEC to the stream identifier SID, may set the directive type DTYPE to a stream (e.g., "10h"), and may set the directive operation DOPER to RAID enable (e.g., "03h"). The storage device 100 may determine the RAID enable request based on the operation code OPC of the admin command, the directive value DSPEC, the directive type DTYPE, and the directive operation DOPER.

In some example embodiments, the host 11 may send the RAID disable request to storage device 100. The RAID disable request may be a directive send command. The host 11 may set the operation code of the admin command to directive transfer (e.g., "19b"), may set the directive value DSPEC to the stream identifier SID, may set the directive type DTYPE to a stream (e.g., "10h"), and may set the directive operation DOPER to RAID disable (e.g., "04h"). The storage device 100 may determine the RAID disable request based on the operation code OPC of the admin command, the directive value DSPEC, the directive type DTYPE, and the directive operation DOPER.

Referring to FIG. 19, the RAID setting request may be a directive send command. The host 11 may set whether to apply the RAID of the storage device 100 to the specific stream through the directive send command.

In some example embodiments, unlike the directive operation DOPER of FIG. 18, the directive operation DOPER of FIG. 19 may include a release identifier, a release resource, and set RAID information. A value of the release identifier may be "01h", a value of the release resource may be "02h", and a value of the set RAID information may be "03h".

The thirteenth double word Dword12 may include RAID information RINFO. The RAID information RINFO may include RAID enable and/or RAID disable. A value of the RAID disable may be "0b", and a value of the RAID enable may be "1b".

In some example embodiments, the host 11 may send the RAID enable request to storage device 100. The RAID enable request may be a directive send command. The host 11 may set an operation code of the admin command to directive transfer (e.g., "19b"), may set the directive value DSPEC to the stream identifier SID, may set the directive type DTYPE to a stream (e.g., "10h"), may set the directive operation DOPER to RAID information (e.g., "03h"), and may set the RAID information RINFO to RAID enable (e.g., "01b"). The storage device 100 may determine the RAID enable request based on the operation code OPC of the admin command, the directive value DSPEC, the directive type DTYPE, the directive operation DOPER, and the RAID information RINFO.

In some example embodiments, the host 11 may send the RAID disable request to storage device 100. The RAID disable request may be a directive send command. The host 11 may set an operation code of the admin command to directive transfer (e.g., "19b"), may set the directive value DSPEC to the stream identifier SID, may set the directive type DTYPE to a stream (e.g., "10h"), may set the directive operation DOPER to RAID information (e.g., "03h"), and may set the RAID information RINFO to RAID disable (e.g., "04h"). The storage device 100 may determine the RAID disable request based on the operation code OPC of the admin command, the directive value DSPEC, the directive type DTYPE, the directive operation DOPER, and the RAID information RINFO.

In some example embodiments, the host 11 may receive RAID information about each of a plurality of streams from the storage device 100. The host 11 may send the RAID status request to storage device 100. The storage device 100 may send information about whether to apply the RAID to each of the plurality of streams to the host 11 in response to the RAID status request.

For example, the RAID status request may be a directive receive command. The host 11 may receive RAID information about each of the plurality of streams from the storage device 100 through the directive receive command. The host 11 may set the operation code of the admin command to directive receive (e.g., "1Ah"), may set the directive value DSPEC to the stream identifier SID, may set the directive type DTYPE to a stream (e.g., "10h"), and may set the directive operation DOPER to parameter return (e.g., "01h"). Alternatively, the host 11 may set the operation code of the admin command to directive receive (e.g., "1Ah"), may set the directive value DSPEC to the stream identifier SID, may set the directive type DTYPE to a stream (e.g., "10h"), and may set the directive operation DOPER to stream RAID status. In response to the directive receive command, the storage device 100 may send, to the host 11, data including the information about whether to apply the RAID to (e.g., RAID enablement status of) each of the plurality of streams based on RAID information included in stream information.

Referring to FIG. 20, the RAID setting request may be a set feature command. The host 11 may set whether to apply the RAID of the storage device 100 to a specific stream through the set feature command. The set feature command may include first to sixteenth double words Dword0 to Dword15. For convenience of description, additional description associated with the elements described above will be omitted to avoid redundancy.

The set feature command may be an admin command, and the operation code OPC of the set feature command may be "09h". The eleventh double word Dword10 may include "SV" and "FID". "SV (Save)" may indicate whether to store attributes, and "FID (Feature Identifier)" may indicate a feature (or attribute or characteristic) identifier. For example, the feature identifier FID may further include a stream RAID configuration. The fourteenth double word Dword13 may include the stream identifier SID and the RAID information RINFO. The RAID information RINFO may include RAID enable and/or RAID disable. A value of the RAID disable may be "0b", and a value of the RAID enable may be "1b".

In some example embodiments, the host 11 may send the RAID enable request to storage device 100. The RAID enable request may be a set feature command. The host 11 may set the operation code of the admin command to set feature (e.g., "09h"), may set the feature identifier FID to the stream RAID configuration, may set a value of the stream identifier SID, and may set the RAID information RINFO to RAID enable (e.g., "01b"), The storage device 100 may determine the RAID enable request based on the operation code OPC of the admin command, the feature identifier FID, the stream identifier SID, and the RAID information RINFO.

In some example embodiments, the host 11 may send the RAID disable request to storage device 100. The RAID disable request may be a set feature command. The host 11 may set the operation code of the admin command to set feature (e.g., "09h"), may set the feature identifier FID to the stream RAID configuration, may set a value of the stream identifier SID, and may set the RAID information RINFO to RAID disable (e.g., "00b"). The storage device 100 may determine the RAID disable request based on the operation code OPC of the admin command, the feature identifier FID, the stream identifier SID, and the RAID information RINFO.

In some example embodiments, the host 11 may send the RAID status request to the storage device 100. For example, the RAID status request may be a get feature command. The host 11 may set the operation code of the admin command to get feature (e.g., "0Ah") and may set the feature identifier FID to the stream RAID configuration. In response to the get feature command, the storage device 100 may send, to the host 11, data including the information about whether to apply the RAID to each of the plurality of streams based on RAID information included in stream information.

Figure 21:
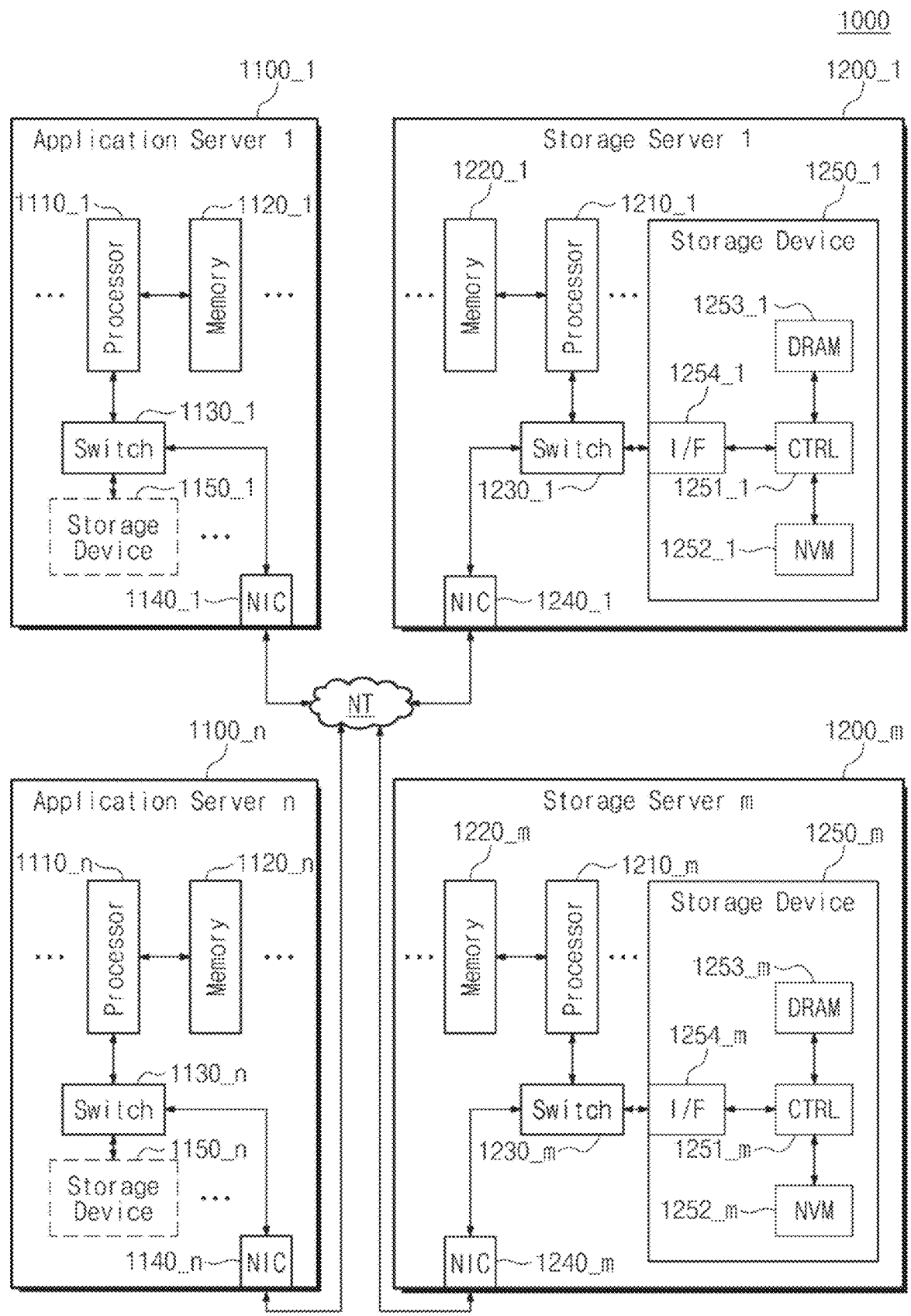
FIG. 21 is a block diagram illustrating a data center to which a storage device according to some example embodiments of the present disclosure is applied.

FIG. 21 is a diagram of a data center 1000 to which a memory device is applied, according to some example embodiments. Referring to FIG. 21, the data center 1000 may be a facility that collects various types of pieces of data and provides services and be referred to as a data storage center. The data center 1000 may be a system for operating a search engine and a database, and may be a computing system used by companies, such as banks, or government agencies. The data center 1000 may include application servers 1100_1 to 1100_n and/or storage servers 1200_1 to 1200_m. The number of application servers 1100_1 to 1100_n and the number of storage servers 1200_1 to 1200_m may be variously selected according to some example embodiments. The number of application servers 1100_1 to 1100_n may be different from the number of storage servers 1200_1 to 1200_m. According to some example embodiments, operations described herein as being performed by the application servers 1100_1 to 1100_n and/or storage servers 1200_1 to 1200_m may be performed by processing circuitry.

Below, for convenience of description, some example embodiments of the first storage server 1200_1 will be described. Each of the other storage servers 1200_2 to 1200_m and the plurality of application servers 1100_1 to 1100_n may have a similar configuration or structure of the first storage server 1200_1.

The storage server 1200_1 may include at least one of processing circuitry 1210_1, a memory 1220_1, a network interface card (NIC) 1240_1, and/or a storage device 1250_1. By way of example, the processing circuitry of the storage server 1200_1 may be referred to as a processor 1210_1 herein. The processor 1210_1 may control all operations of the storage server 1200_1, access the memory 1220_1, and execute instructions and/or data loaded in the memory 1220_1. The memory 1220_1 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM).

In some example embodiments, the numbers of processors 1210_1 and memories 1220_1 included in the storage server 1200_1 may be variously selected. In some example embodiments, the processor 1210_1 and the memory 1220_1 may provide a processor-memory pair. In some example embodiments, the number of processors 1210_1 may be different from the number of memories 1220_1. The processor 1210_1 may include a single-core processor or a multi-core processor.

The switch 1230_1 may selectively connect the processor 1210_1 to the storage device 1250_1, or selectively connect the NIC 1240_1 to the storage device 1250_1, via the control of the processor 1210_1.

The NIC 1240_1 may be configured to connect the first storage server 1200_1 with the network NT. In some example embodiments, the NIC 1240_1 may include a network interface card and/or a network adaptor. The NIC 1240_1 may be connected to the network NT by a wired interface, a wireless interface, a Bluetooth interface, and/or an optical interface. The NIC 1240_1 may include an internal memory, a digital signal processor (DSP), and/or a host bus interface and be connected to the processor 1210_1 and/or the switch 1230_1 through the host bus interface. The host bus interface may be implemented as one of the above-described examples of the interface 1254_1 such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface. In some example embodiments, the NIC 1240_1 may be integrated with at least one of the processor 1210_1, the switch 1230_1, and/or the storage device 1250_1.

The storage device 1250_1 may store or read out data under the control of the processor 1210_1. The storage device 1250_1 may include processing circuitry 1251_1, a nonvolatile memory 1252_1, DRAM 1253_1, and/or an interface 1254_1. In some example embodiments, the storage device 1250_1 may include a secure element (SE) for security or privacy. By way of example, the processing circuitry of the storage device 1250_1 may be referred to as a controller 1251_1 herein.

The controller 1251_1 may control all operations of the storage device 1250_1. In some example embodiments, the controller 1251_1 may include an SRAM. The controller 1251_1 may write data to the nonvolatile memory 1252_1 in response to a write command or read data from the nonvolatile memory device 1252_1 in response to a read command. In some example embodiments, the controller 1252_1 may be configured to control the nonvolatile memory 1252_1 based on a Toggle interface or an ONFI interface.

The DRAM 1253_1 may temporarily store (or buffer) data to be written to the nonvolatile memory 1252_1 or data read from the nonvolatile memory 1252_1. Also, the DRAM 1253_1 may store data used for the controller 1251_1 to operate, such as metadata or mapping data. The interface 1254_1 may provide a physical connection between the at least one of processor 1210_1, the memory 1220_1, the network interface card (NIC) 1240_1, and/or the controller 1251_1. In some example embodiments, the interface 1254_1 may be implemented using a direct attached storage (DAS) scheme in which the storage device 1250_1 is directly connected with a dedicated cable. In some example embodiments, the interface 1254_1 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface. According to some example embodiments, the first application server 1100_1 may include at least one of processing circuitry 1110_1, a memory 1120_1, an NIC 1140_1, and/or a storage device 1150_1. By way of example, the processing circuitry of the first application server 1100_1 may be referred to as a processor 1110_1 herein. The processor 1110_1 may control all operations of the first application server 1100_1, access the memory 1120_1, and execute instructions and/or data loaded in the memory 1120_1. The memory 1120_1 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). According to some example embodiments, the switch 1130_1 may selectively connect the processor 1110_1 to the storage device 1150_1, or selectively connect the NIC 1140_1 to the storage device 1150_1, via the control of the processor 1110_1. For convenience of description, some example embodiments of the first application server 1100_1 have been described. Each of the other application servers 1100_2 to 1100_n may have a similar configuration or structure of the first application server 1100_1.

The above configuration of the storage server 1200_1 is a simple example, and the present disclosure is not limited thereto. The above configuration of the storage server 1200_1 may be applied to each of other storage servers or the plurality of application servers. In some example embodiments, in each of the plurality of application servers 1100_1 to 1100_n, the storage device may be selectively omitted.

The application servers 1100_1 to 1100_n may communicate with the storage servers 1200_1 to 1200_m through a network NT. The network NT may be implemented by using a fiber channel (FC) or Ethernet. In this case, the FC may be a medium used for relatively high-speed data transmission and use an optical switch with high performance and high availability. The storage servers 1200_1 to 1200_m may be provided as file storages, block storages, and/or object storages according to an access method of the network NT.

In some example embodiments, the network NT may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In some example embodiments, the network NT may be a general network, such as a TCP/IP network. For example, the network NT may be implemented according to a protocol, such as FC over Ethernet (FCoE), network attached storage (NAS), and/or NVMe over Fabrics (NVMe-oF).

In some example embodiments, at least one of the plurality of application servers 1100_1 to 1100_n may be configured to access to at least other one of the plurality of application servers 1100_1 to 1100_n or at least one of the plurality of storage servers 1200_1 to 1200_m.

For example, the application server 1100_1 may store data, which is requested by a user or a client to be stored, in one of the storage servers 1200_1 to 1200_m through the network NT. Also, the application server 1100_1 may obtain data, which is requested by the user or the client to be read, from one of the storage servers 1200_1 to 1200_m through the network NT. For example, the application server 1100_1 may be implemented as a web server or a database management system (DBMS).

The application server 1100_1 may access a memory 1120_n or a storage device 1150_n, which is included in another application server 1100_n, through the network NT. Alternatively or additionally, the application server 1100_1 may access memories 1220_1 to 1220_m or storage devices 1250_1 to 1250_m, which are included in the storage servers 1200_1 to 1200_m, through the network NT. Thus, the application server 1100_1 may perform various operations on data stored in application servers 1100_1 to 1100_n and/or the storage servers 1200_1 to 1200_m. For example, the application server 1100_1 may execute an instruction for moving or copying data between the application servers 1100_1 to 1100_n and/or the storage servers 1200_1 to 1200_m. In this case, the data may be moved from the storage devices 1250_1 to 1250_m of the storage servers 1200_1 to 1200_m to the memories 1120_1 to 1120_n of the application servers 1100_1 to 1100_n directly or through the memories 1220_1 to 1220_m of the storage servers 1200_1 to 1200_m. The data moved through the network NT may be data encrypted for security or privacy.

According to the present disclosure, a storage device may support a multi-stream, and may set whether to use an RAID manner for a specific stream. Accordingly, an operation method of a storage device provides improved performance and manages a storage space efficiently, and an operation method of a storage system including a host and the storage device are provided.

Conventional storage devices for implementing RAID generate and store RAID parity data with respect to all data (e.g., metadata or user data) being stored in the storage device. The RAID parity data provides improved data reliability. However, generating and storing RAID parity data for all of the data results in excessive resource consumption (e.g., processor, memory capacity, power, delay, etc.).

However, according to some example embodiments, improved storage devices and systems are provided for selective implementation of RAID. For example, the improved storage devices and systems may selectively generate and store RAID parity data for some streams while storing other streams without generating and storing RAID parity data. Also, the improved storage devices and systems provide for enabling and disabling RAID with respect to each specific stream without performing a reset operation or firmware change (e.g., update). Accordingly, the improved storage devices provide improved flexibility enabling selective use of RAID, and thereby, provide improved data reliability for specific streams while reducing resource consumption resulting from the storage of other streams.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with some example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the present disclosure has been described with reference to some example embodiments thereof, it will be apparent to those of ordinary skill in the art that various changes and modifications may be made thereto without departing from the spirit and scope of the present disclosure as set forth in the following claims.

What is claimed is:

1. An operation method of a storage device, the method comprising:
   generating Redundant Array of Independent Disks (RAID) parity data based on first data in response to an RAID enable request and a first write request, the RAID enable request and the first write request being received from an external host, the RAID enable request including a first stream identifier and a RAID enable indication, and the first write request including the first stream identifier and the first data;
   storing the first data and the RAID parity data in a nonvolatile memory device based on the first stream identifier;
   storing second data in the nonvolatile memory device based on a second stream identifier in response to receiving a second write request from the external host, the second write request including the second stream identifier and the second data; and
   receiving an RAID disable request from the external host, the RAID disable request including the first stream identifier and a RAID disable indication.

2. The method of claim 1, further comprising:
   storing third data in the nonvolatile memory device based on the first stream identifier in response to receiving the RAID disable request and a third write request, the third write request being received from the external host after the receiving the RAID disable request, and the third write request including the first stream identifier and the third data.

3. The method of claim 2, wherein the storing the first data and the RAID parity data, the receiving the RAID disable request and the storing the third data are performed without a firmware update of the storage device being performed, the third write request being received after the first write request is received.

4. The method of claim 1, wherein the RAID enable request is a directive send command including the first stream identifier.

5. The method of claim 1, wherein the RAID enable request is a set feature command including the first stream identifier, a stream RAID configuration indication, and the RAID enable indication.

6. The method of claim 1, further comprising:
   determining whether a first memory block corresponding to the first stream identifier includes an erase word line in response to the RAID enable request;
   closing the first memory block in response to determining the first memory block includes the erase word line, the closing the first memory block includes applying a program voltage to the erase word line; and
   setting first RAID information corresponding to the first stream identifier to an enable state based on the RAID enable request.

7. The method of claim 6, wherein the generating the RAID parity data comprises:
   checking the first RAID information corresponding to the first stream identifier; and
   generating the RAID parity data based on the first data in response to determining the first RAID information indicates the enable state.

8. The method of claim 1, further comprising:

receiving a directive receive command including a directive value (DSPEC) indicating the first stream identifier and a directive operation (DOPER) indicating a stream RAID status from the external host; and sending a RAID enablement status with regard to the first stream identifier and the second stream identifier to the external host in response to the directive receive command.

9. The method of claim 1, further comprising:

reading a first subset of the first data from the nonvolatile memory device in response to a first read request, the first read request being received from the external host after the storing the first data and the RAID parity data, and the first read request including an address corresponding to the first subset of the first data;

detecting an error of the first subset of the first data;

reading a second subset of the first data and the RAID parity data from the nonvolatile memory device after the detecting the error;

performing a recovery operation based on the second subset of the first data and the RAID parity data to obtain a recovered first subset of the first data; and sending the recovered first subset of the first data to the external host.

10. The method of claim 1, further comprising:

reading a first subset of the second data from the nonvolatile memory device in response to a second read request, the second read request being received from the external host after the storing the second data, the second read request including an address corresponding to the first subset of the second data;

detecting an error of the first subset of the second data; and sending a completion entry to the external host, the completion entry corresponding to the second read request and including read failure information.

11. The method of claim 1, further comprising:

determining whether a second memory block corresponding to the first stream identifier includes an erase word line in response to the RAID disable request;

closing the second memory block in response to determining the second memory block includes the erase word line, the closing the second memory block includes applying a program voltage to the erase word line; and setting first RAID information corresponding to the first stream identifier to a disable state based on the RAID disable request.

12. The method of claim 11, further comprising:

receiving a third write request from the external host after the receiving the RAID disable request, the third write request including the first stream identifier and third data from the external host; and storing the third data without corresponding RAID parity data in the nonvolatile memory device based on the first stream identifier and the first RAID information indicating the disable state.

13. The method of claim 12, wherein the storing the first data and the RAID parity data includes storing the first data and the RAID parity data in a first memory block of the nonvolatile memory device;

the storing the second data includes storing the second data in the second memory block of the nonvolatile memory device, the second memory block being different from the first memory block; and the storing the third data includes storing the third data in a third memory block of the nonvolatile memory device, the third memory block being different from the first memory block and the second memory block.

14. An operation method of a storage device, the method comprising:

storing first data in a nonvolatile memory device based on a first stream identifier in response to a first write request, the first write request being received from an external host, and the first write request including the first stream identifier and the first data;

generating Redundant Array of Independent Disks (RAID) parity data based on second data in response to an RAID enable request and a second write request, the second write request being received from the external host after the RAID enable request is received from the external host, the RAID enable request including the first stream identifier, and the second write request including the first stream identifier and the second data;

storing the second data and the RAID parity data in the nonvolatile memory device based on the first stream identifier;

storing third data in the nonvolatile memory device based on the first stream identifier in response to a RAID disable request and a third write request, the RAID disable request and the third write request being received from the external host, the RAID disable request being received after the storing the second data and the RAID parity data, the RAID disable request including the first stream identifier, and the third write request including the first stream identifier and the third data; and storing fourth data in the nonvolatile memory device based on a second stream identifier in response to a fourth write request, the fourth write request being received from the external host, and the fourth write request including the second stream identifier and the fourth data.

15. The method of claim 14, further comprising:

reading a first subset of the first data from the nonvolatile memory device in response to a first read request, the first read request being received from the external host after the storing the first data, and the first read request including an address corresponding to the first subset of the first data;

detecting an error of the first subset of the first data; and sending a completion entry to the external host, the completion entry corresponding to the first read request and including read failure information.

16. The method of claim 15, further comprising:

reading a first subset of the second data from the nonvolatile memory device in response to a second read request, the second read request being received after the storing the second data and the RAID parity data, the second read request including an address corresponding to the first subset of the second data;

detecting an error of the first subset of the second data;

reading a second subset of the second data and the RAID parity data from the nonvolatile memory device;

performing a recovery operation based on the second subset of the second data and the RAID parity data to obtain a recovered first subset of the second data; and sending the recovered first subset of the second data to the external host.

17. The method of claim 14, wherein the RAID enable request is a first directive send command including the first stream identifier and an RAID enable indication; and the RAID disable request is a second directive send command including the first stream identifier and an RAID disable indication.

18. The method of claim 14, wherein the storing the first data, the storing the second data and the RAID parity data, the storing the third data and the storing the fourth data being performed without a firmware update of the storage device being performed, the fourth write request being received after the first write request is received.

19. An operation method of a storage system, the storage system including a host and a storage device, the method comprising:
- sending, by the host, a first directive send command including a first stream identifier and a Redundant Array of Independent Disks (RAID) enable indication;
- setting, by the storage device, first RAID information corresponding to the first stream identifier to an enable state in response to the first directive send command;
- sending, by the host, a first write request to the storage device, the first write request including the first stream identifier and first data;
- generating, by the storage device, RAID parity data based on the first data in response to the first write request and the first RAID information being set to the enable state;
- storing, by the storage device, the first data and the RAID parity data in a nonvolatile memory device based on the first stream identifier;
- sending, by the host, a second write request to the storage device, the second write request including a second stream identifier and second data;
- storing, by the storage device, the second data in the nonvolatile memory device based on the second stream identifier in response to the second write request;
- sending, by the host, a second directive send command including the first stream identifier and an RAID disable indication; and
- setting, by the storage device, the first RAID information to a disable state in response to the second directive send command.

20. The method of claim 19, further comprising:
- sending, by the host, a third write request to the storage device after the sending the second directive send command, the third write request including the first stream identifier and third data; and
- storing, by the storage device, the third data in the nonvolatile memory device based on the first stream identifier in response to third write request and the first RAID information being set to the disable state.

* * * * *